US 8,204,113 B2

(12) United States Patent
Kondo et al.

(10) Patent No.: US 8,204,113 B2
(45) Date of Patent: Jun. 19, 2012

(54) MOVING PICTURE CODING APPARATUS, MOVING PICTURE DECODING APPARATUS, AND STREAM DATA

(75) Inventors: Satoshi Kondo, Kyoto (JP); Tadamasa Toma, Osaka (JP); Hiroshi Saito, Osaka (JP); Thomas Wedi, Gross-Umstadt (DE); Steffen Wittmann, Morfelden-Walldorf (DE)

(73) Assignee: Panasonic Corporation, Osaka (JP)

( * ) Notice: Subject to any disclaimer, the term of this patent is extended or adjusted under 35 U.S.C. 154(b) by 1163 days.

(21) Appl. No.: 11/996,034

(22) PCT Filed: Jun. 18, 2006

(86) PCT No.: PCT/JP2006/314184
§ 371 (c)(1),
(2), (4) Date: Jan. 17, 2008

(87) PCT Pub. No.: WO2007/010901
PCT Pub. Date: Jan. 25, 2007

(65) Prior Publication Data
US 2009/0257491 A1    Oct. 15, 2009

(30) Foreign Application Priority Data

Jul. 18, 2005  (EP) .................................. 05015562
Oct. 11, 2005  (EP) .................................. 05022148

(51) Int. Cl.
*H04N 7/12*   (2006.01)
*H04N 11/02*  (2006.01)
*H04N 14/04*  (2006.01)
*G06K 9/36*   (2006.01)

(52) U.S. Cl. ......... 375/240.12; 375/240.16; 375/240.25; 382/233; 382/239

(58) Field of Classification Search ............ 375/240.12–240.25; 348/445–458; 382/236–238, 154–166; 386/241–249
See application file for complete search history.

(56) References Cited

U.S. PATENT DOCUMENTS 5,072,290 A * 12/1991 Yamagami et al. ...... 375/240.25
(Continued)

FOREIGN PATENT DOCUMENTS

EP      1 033 885       9/2000
(Continued)

OTHER PUBLICATIONS

International Search Report issued Oct. 24, 2006 in the International (PCT) Application of which the present application is the U.S. National Stage.

(Continued)

*Primary Examiner* — Man Phan
(74) *Attorney, Agent, or Firm* — Wenderoth, Lind & Ponack, L.L.P.

(57) ABSTRACT

A signal separation unit (101) separates an input picture made up of component pictures of RGB, each of which has an equal number of pixels as the input picture, into three component pictures, and outputs the three component pictures. Each of coding units (102 to 104) codes one of the component pictures into an intra-picture prediction coded picture or an inter-picture prediction coded picture, and outputs a bit stream corresponding to the component picture. A bit stream multiplexing unit (105) multiplexes three bit streams outputted from the three coding units into one bit stream, and outputs the bit stream. Each of the coding units (102), (103) and (104) determines a prediction method for the component picture at the time of coding.

7 Claims, 18 Drawing Sheets

U.S. PATENT DOCUMENTS

| | | | |
|---|---|---|---|
| 5,209,220 | A | 5/1993 | Hiyama et al. |
| 5,379,757 | A * | 1/1995 | Hiyama et al. ............... 600/109 |
| 5,428,394 | A * | 6/1995 | Yamagami et al. ...... 375/240.25 |
| 6,463,179 | B1 * | 10/2002 | Kondo et al. ................. 382/239 |
| 6,904,172 | B2 * | 6/2005 | Kondo et al. ................. 382/233 |
| 6,975,771 | B1 * | 12/2005 | Kondo et al. ................. 382/239 |
| 7,433,407 | B2 * | 10/2008 | Lee et al. ................ 375/240.16 |
| 7,535,961 | B2 * | 5/2009 | Cho et al. ................ 375/240.12 |
| 7,630,435 | B2 * | 12/2009 | Chen et al. ............... 375/240.03 |
| 2002/0101928 | A1 | 8/2002 | Auvray et al. |
| 2005/0041742 | A1 * | 2/2005 | Abe et al. ................ 375/240.24 |
| 2005/0047506 | A1 * | 3/2005 | Kadono et al. ........... 375/240.12 |
| 2005/0141612 | A1 * | 6/2005 | Abe et al. ................ 375/240.16 |

FOREIGN PATENT DOCUMENTS

| | | |
|---|---|---|
| EP | 1 928 184 A1 | 6/2008 |
| JP | 63-76685 | 4/1988 |
| JP | 3-121037 | 5/1991 |
| JP | 4-152930 | 5/1992 |
| JP | 10-32822 | 2/1998 |
| JP | 2005-39842 | 2/2005 |
| WO | 99/37097 | 7/1999 |
| WO | 00/18133 | 3/2000 |
| WO | 2004/088989 | 10/2004 |

OTHER PUBLICATIONS

"Coding of Moving Pictures and Audio", ISO/IEC JTC1/SC29/WG11, MPEG05/N7081, Apr. 2005, Busan, KR "Editors" Text for ISO/IEC 14496-10:2005 (AVC 3rd Edition).

Extended European Search Report issued Oct. 21, 2011 in corresponding European Application No. 06 78 1197.

Haoping Yu, "Performance Improved 4:4:4 Coding for MPEG4-Part10/H.264", I. AVC Meeting, the Hague; (CCITT SGXVEXPERT Group for ATM Video Coding), XX, XX, No. JVT-O013, Apr. 13, 2005, XP030005961, pp. 1-17.

Iain E G Richardson, "Prediction of Inter Macroblocks in P-slices", Internet Citation, Apr. 30, 2003, pp. 1-3, XP002596717, Retrieved from the Internet: URL:http://www.vcodex.com/files/h264_interpred.pdf.

Thomas Wiegand et al., "Overview of the H.264/AVC Video Coding Standard", IEEE Transactions on Circuits and Systems for Video Technology, IEEE Service Center, Piscataway, NJ, US, vol. 13, No. 7, Jul. 1, 2003, pp. 560-576, XP011099249, ISSN: 1051-8215, DOI: 10.1109/TCSVT.2003.815165.

Steffen Wittmann et al., "Intra-only 4:4:4 Profile for H.264/AVC FRExt", Joint Video Team (JVT) of ISO/IEC MPEG & ITU-T VCEG (ISO/IEC JTC1/SC29/WG11 and ITU-T SG16 Q6), XX, XX, No. JVT-Q086, Oct. 14, 2005, pp. 1-18, XP002441181.

Haoping Yu et al., "Advanced 4:4:4 Profile for MPEG4-Part10/H.264", 1. AVC Meeting, the Hague; (CCITT SGXVEXPERT Group for ATM Video Coding), XX, XX, No. JVT-P017r1, Oct. 15, 2005, XP030006059, pp. 1-22.

* cited by examiner

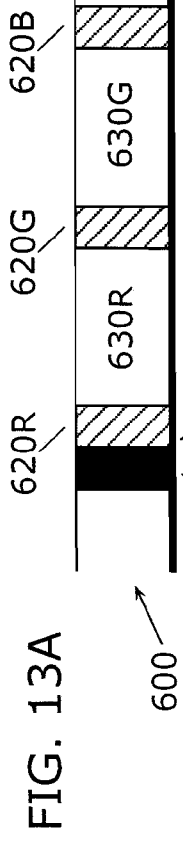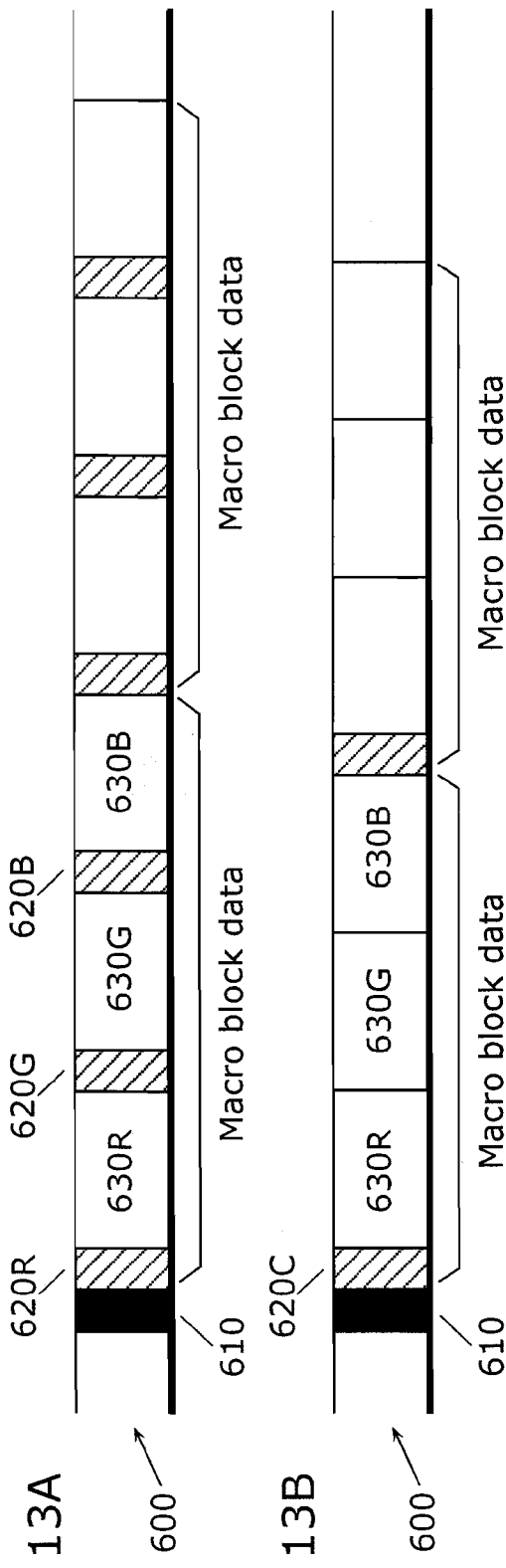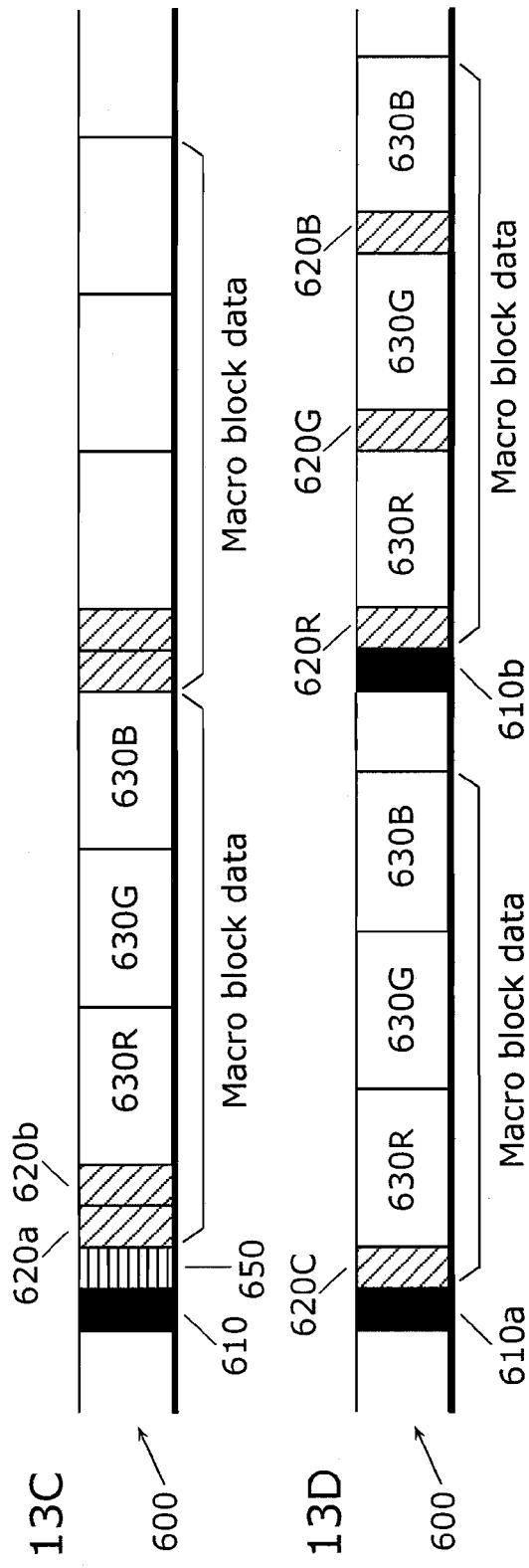
FIG. 13A
FIG. 13B
FIG. 13C
FIG. 13D

FIG. 13E

| Value of flag | Definition of flag |
|---|---|
| Flag_a=0 | Each of three component pictures has been coded in an independent prediction mode (case (1)) |
| =1 | Three component pictures have been coded in a common prediction mode (case (3)) |

FIG. 13F

| Value of flag | Definition of flag |
|---|---|
| Flag_b=0 | Each of three component pictures has been coded in an independent prediction mode (case (1)) |
| =1 | Two component pictures have been coded in a common prediction mode and one component picture has been coded in an independent prediction mode (case (2)) |
| =2 | Three component pictures have been coded in a common prediction mode (case (3)) |

FIG. 13G

| Value of flag | Definition of flag |
|---|---|
| Flag_c1=0 | Two component pictures have been coded in a common prediction mode and one component picture has been coded in an independent prediction mode (case (2)) |
| =1 | Refer to Flag_c2 (other than case (2)) |

| Value of flag | Definition of flag |
|---|---|
| Flag_c2=0 | Each of three component pictures has been coded in an independent prediction mode (case (1)) |
| =1 | Three component pictures have been coded in a common prediction mode (case (3)) |

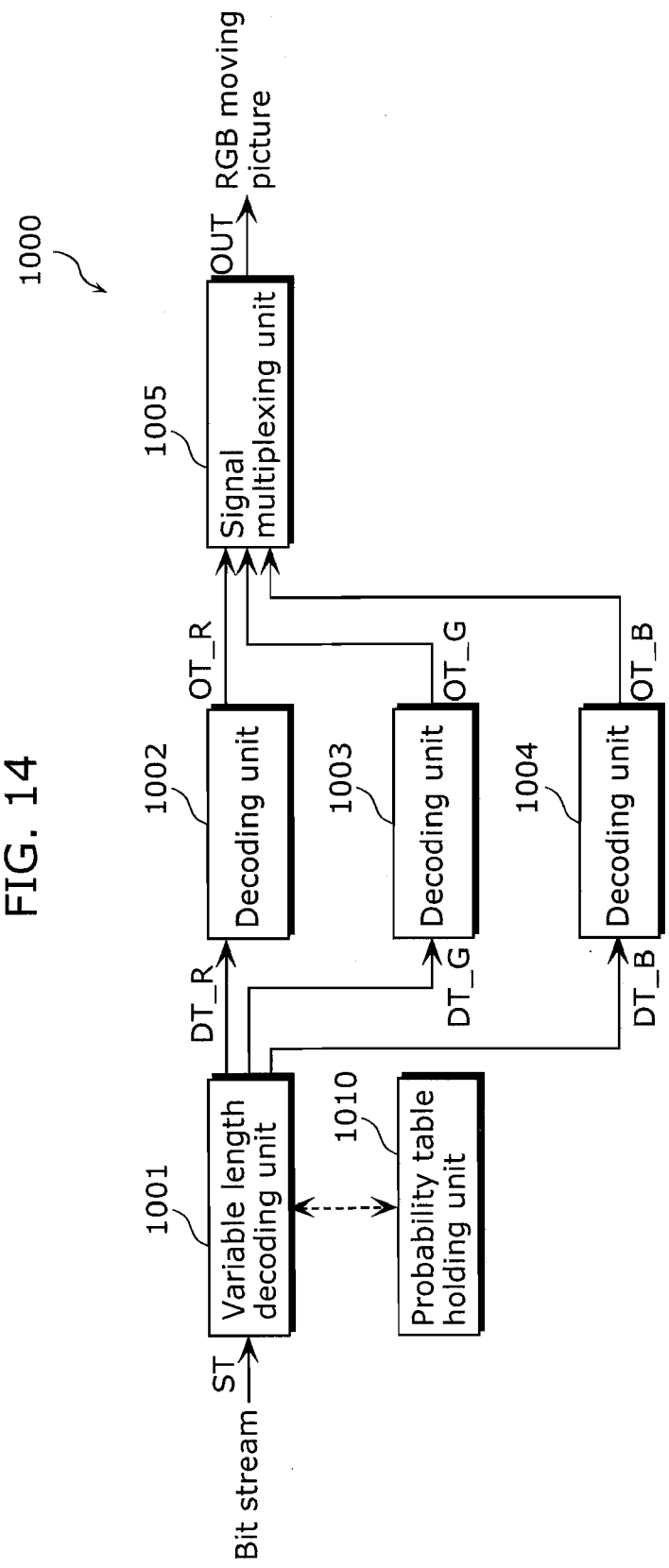

MOVING PICTURE CODING APPARATUS, MOVING PICTURE DECODING APPARATUS, AND STREAM DATA

TECHNICAL FIELD

The present invention relates to a moving picture coding apparatus, a moving picture decoding apparatus, and a bit stream format, when coding or decoding a picture made up of N component pictures (N is an integer that is two or greater), each of the component pictures having equal number of pixels.

BACKGROUND ART

In a Moving Picture Experts Group 4 Advanced Video Coding (MPEG-4 AVC) standard (Non-patent Reference 1) established by the MPEG under the ISO/IEC, a method for coding a moving picture of RGB format is provided. Here, a conventional method for coding and decoding RGB data by mapping the RGB data to YUV data (where a G signal is mapped to a Y signal, a B signal is mapped to a U signal, and a R signal is mapped to a V signal) is provided.

However, in the conventional method, the RGB signal is coded and decoded using the same method as the conventional method for coding and decoding YUV data. In the conventional coding of YUV data, the same intra prediction mode is used for coding U data and V data, whereas an intra prediction mode used for coding Y data is different from an intra prediction mode used for coding U data and V data. Therefore, when mapping the YUV data to the RGB data, although the same intra prediction mode is used for R data and B data, an intra prediction mode used for G data is different from the intra prediction mode used for R data and B data.

In the conventional coding of the YUV data, a motion vector for Y data is used for motion compensation for the U data and the V data. Therefore, when mapping the YUV data to the RGB data, a motion vector for G data is used for motion compensation for the R data and the B data.

Non-Patent Reference 1: Draft of Version 4 of H.264/AVC (ITU-T Recommendation H.264 and ISO/IEC 14496-10 (MPEG-4 Part 10) Advanced Video Coding, JVT-N050d1, Jan. 28, 2005)

DISCLOSURE OF INVENTION

Problems that Invention is to Solve

Coding high-definition and high-quality pictures is becoming necessary for consumer-oriented devices, rather than for professional-use devices (television, camera, and the like). In the aforementioned conventional technique, the 4:2:0 format or 4:2:2 format is used as the format of a YUV signal in most cases for the consumer-oriented devices. On the other hand, the 4:4:4 format for an RGB signal is used for the professional-use devices in order to code high-definition and high-quality pictures. In a conventional technique of mapping RGB data to YUV data, it is difficult to code a 4:4:4 format picture for an RGB signal without degrading its high definition and high quality.

Furthermore, in order to code/decoding processing on high-definition pictures of RGB 4:4:4 format, it is possible to devise an apparatus structure including three encoders and three decoders each of which corresponds to R data, G data, and B data, and operates in parallel. Even in this case, for the aforementioned conventional mapping technique, it is necessary to provide interface circuits in each of the encoders and the decoders in order to receive and pass, in each block between the encoders, information, such as an intra-coded processing method and a motion vector. For this reason, there is a problem that such structures of the encoders/decoders become complex, and the circuit scale increases.

The present invention is for solving the aforementioned problem, and the object is to provide: streams; a moving picture coding apparatus that codes a picture made up of N component pictures; and a moving picture decoding apparatus that decodes such picture, where N is an integer that is 2 or greater, each apparatus having a simple hardware structure.

Means to Solve the Problems

In order to solve the aforementioned problem, the moving picture coding apparatus of the present invention includes: an obtainment unit that obtains N color component pictures that compose one picture, where N is an integer that is 2 or greater; N coding units, each of which codes, in one of intra-picture prediction coding and inter-picture prediction coding, a corresponding one of the N color component pictures, the N coding units being provided so as to correspond to the N color component pictures; and a signal multiplexing unit that multiplexes N bit streams outputted from the N coding units into one bit stream signal, and that outputs the bit stream signal. With this structure, since one coding unit corresponds to one component picture, it is possible to efficiently code a high-definition picture for professional use.

Here, each of the N coding units may independently determine a prediction mode to be used for the intra-picture prediction coding. With this structure, since each of the coding units performs intra-picture prediction coding using a prediction mode independently determined, there is no need to pass, between the N coding units, prediction modes in each block. As a result, there is no need for each of the coding units to include interfaces that pass prediction modes. When each of the coding units is, for example, included in an LSI or a board, it is possible to keep the increase of a circuit scale to the minimum, since there is no need to provide interface circuits that pass prediction modes for each block.

Furthermore, since each of the coding units independently determine a prediction mode, it is possible to improve the coding efficiency in the intra-picture prediction coding.

Here, each of the N coding units may independently determine a motion vector to be used for the inter-picture prediction coding. With this structure, since each of the coding units performs inter-picture prediction coding using an motion vector independently determined, there is no need to pass, between the N coding units, prediction modes for inter-picture prediction coding. As a result, there is no need for each of the coding units to include interfaces that pass prediction modes. When each of the coding units is, for example, included in an LSI or a board, it is possible to keep the increase of a circuit scale to the minimum.

Here, each of the N coding units may independently determine a prediction mode to be used for the intra-picture prediction coding, one of the N coding units may determine a motion vector to be used for the inter-picture prediction coding, and the N coding units may perform the inter-picture prediction coding by commonly using the motion vector. With this structure, it is possible to improve the coding efficiency in the intra-picture prediction coding. Furthermore, one of the N coding units has only to include a circuit (motion estimation circuit) that determines a motion vector, and there is no need to include other coding units. Generally, since a scale of the motion estimation circuit is large, it is possible to reduce the circuit area of the other coding units.

Here, it is possible that the N coding units individually use respective prediction modes or commonly use a prediction mode for the intra-picture prediction coding, and the signal multiplexing unit may insert, in the bit stream signal, coding information indicating correspondence between the N color component pictures and prediction modes to be used for the intra-picture prediction coding. With this structure, the moving picture decoding apparatus can easily determine between which coding units from among the N coding units a common prediction mode is used for the intra-picture prediction coding, using the bit stream signal in which the coding information is inserted, and can simplify the decoding processing.

Here, the coding information may include the number of prediction modes and one or more of identifiers of the prediction modes, and the coding information may further include assignment information indicating color component pictures to which a common prediction mode is assigned when the prediction mode common to the color component pictures exists in the coding information. With this structure, the moving picture decoding apparatus can simplify the decoding processing by determining the number of prediction modes, one or more of identifiers of the prediction modes, and assignment information.

Here, the coding information may include a prediction mode flag, and the prediction mode flag may indicate one of: (a) that each of the N color component pictures has been coded in an independent prediction mode; (b) that the N color component pictures have been coded in a common prediction mode; and (c) that two or more of the N color component pictures have been coded in a common prediction mode and one or more of the N color component pictures other than the two or more of the N color component pictures has been coded in an independent prediction mode. This structure is appropriate for a coding method and a decoding method each of which selectively uses one of the (a) to (c). In such a case, the prediction mode flag may be 2 bits.

Here, the coding information may include a prediction mode flag, and the prediction mode flag may indicate one of: (a) that each of the N color component pictures has been coded in an independent prediction mode; and (b) that the N color component pictures have been coded in a common prediction mode. This structure is appropriate for a coding method and a decoding method each of which selectively uses one of the (a) and (b). In such a case, the prediction mode flag may be 1 bit.

Here, the coding information may include a first prediction mode flag, the first prediction mode flag may indicate one of: (i) that two or more of the N color component pictures have been coded in a common prediction mode and one or more of the N color component pictures other than the two or more of the N color component pictures has been coded in an independent prediction mode; and (ii) a case other than (i), the coding information further includes a second prediction mode flag when the first prediction mode flag indicates (ii), and the second prediction mode flag may indicate one of: (a) that each of the N color component pictures has been coded in an independent prediction mode; and (b) that the N color component pictures have been coded in a common prediction mode. This structure is appropriate for a coding method and a decoding method each of which selectively uses one of the (a), (b), and (i). In such a case, the prediction mode flag may be 1 bit or 2 bits.

Here, the N coding units may be N semiconductor integrated devices. With this structure, when the number of pixels of a picture is many (for example, in the case of a super-high resolution picture having the degree of resolution equal to or more than the HDTV, it is possible to efficiently code each of component pictures, even when it is difficult to code a picture using one coding unit.

Furthermore, the moving picture decoding apparatus of the present invention includes: a separation unit that separates a bit stream signal into N bit streams corresponding to N color component pictures that compose one picture, where N is an integer that is 2 or greater, the bit stream signal indicating a coded moving picture; N decoding units, each of which decodes, in one of intra-picture prediction decoding and inter-picture prediction decoding, a corresponding one of the N bit streams, the N decoding units being provided so as to correspond to the N bit streams; and a picture multiplexing unit that multiplexes the N color component pictures from the N decoding units into the one picture.

With this structure, there is no need to pass, between the N decoding units, prediction modes for intra-picture prediction coding for each block. As a result, there is no need for each of the coding units to include interfaces that pass prediction modes. When each of the coding units is, for example, included in an LSI or a board, it is possible to keep the increase of a circuit scale to the minimum, since there is no need to provide interface circuits that pass prediction modes for each block.

Here, each of the N decoding units may perform the intra-picture prediction decoding in an independent prediction mode.

Here, each of the N decoding units may perform the inter-picture prediction decoding using an independent motion vector.

Here, it is possible that each of the N decoding units may perform the intra-picture prediction decoding in an independent prediction mode, and the N decoding units may perform the inter-picture prediction decoding using a common motion vector.

Here, the separation unit may separate the coding signal into coding information indicating correspondence between the N color component pictures and prediction modes to be used for the intra-picture prediction decoding, and each of the N decoding units may perform the intra-picture prediction decoding according to the coding information.

Here, the coding information may include the number of prediction modes and one or more of identifiers of the prediction modes, and the coding information may further include assignment information indicating color component pictures to which a common prediction mode is assigned when the prediction mode common to the color component pictures exists in the coding information.

Here, the coding information may include a prediction mode flag, and the prediction mode flag indicates one of: (a) that each of the N color component pictures has been coded in an independent prediction mode; and (b) that the N color component pictures have been coded in a common prediction mode.

Here, the coding information may include a prediction mode flag, and the prediction mode flag may indicate one of: (a) that each of the N color component pictures has been coded in an independent prediction mode; (b) that the N color component pictures have been coded in a common prediction mode; and (c) that two or more of the N color component pictures have been coded in a common prediction mode and one or more of the N color component pictures other than the two or more of the N color component pictures has been coded in an independent prediction mode.

Here, the coding information may include a first prediction mode flag, the first prediction mode flag may indicate one of: (i) that two or more of the N color component pictures have been coded in a common prediction mode and one or more of the N color component pictures other than the two or more of the N color component pictures has been coded in an independent prediction mode; and (ii) a case other than (i), the coding information further includes a second prediction mode flag when the first prediction mode flag indicates (ii), and the second prediction mode flag may indicate one of: (a) that each of the N color component pictures has been coded in an independent prediction mode; and (b) that the N color component pictures have been coded in a common prediction mode.

Here, the N decoding units may be N semiconductor integrated devices.

Furthermore, the stream data of the present invention includes N bit streams and coding information, wherein the 1N bit streams represent N color component pictures that compose one picture, where N is an integer that is 2 or greater, and the coding information indicates correspondence between the 1N color component pictures and prediction modes to be used for the intra-picture prediction decoding.

Industrial Applicability

A moving picture coding apparatus, a moving picture decoding apparatus, and a bit stream format according to the present invention have an effect that coding processing and decoding processing can be performed independently for each signal so that the structures of the coding apparatus and decoding apparatus can be simplified. They are useful as the moving picture coding apparatus, the moving picture decoding apparatus, and the bit stream.

BRIEF DESCRIPTION OF DRAWINGS

FIG. 13A illustrates a format of a data stream.
FIG. 13B illustrates a format of a data stream.
FIG. 13C illustrates a format of a data stream.
FIG. 13D illustrates a format of a data stream.
FIG. 13E describes an example of a prediction mode flag.
FIG. 13F describes an example of a prediction mode flag.
FIG. 13G describes an example of a prediction mode flag.
FIG. 14 is a block diagram showing an example of a structure of the moving picture decoding apparatus in the third embodiment.

NUMERICAL REFERENCES

100 Moving picture coding apparatus
101 Signal separation unit
102, 103, 104 Coding unit
105 Bit stream multiplexing unit
106 Control unit
1000 Moving picture decoding apparatus
1001 Variable length decoding unit
1002, 1003, 1004 Decoding unit
1005 Signal multiplexing unit
1010 Probability table holding unit

BEST MODE FOR CARRYING OUT THE INVENTION

First Embodiment

The present embodiment describes a moving picture coding apparatus including: an obtainment unit that obtains N component pictures that compose one picture, where each of the component pictures has an equal number of pixels and N is an integer that is 2 or greater; N coding units, each of which codes, in intra-picture prediction coding, a corresponding one of the N component pictures, the N coding units being provided so as to correspond to the N color component pictures; and a signal multiplexing unit that multiplexes N bit streams outputted from the N coding units into one bit stream signal. The each of the N coding units independently determines a prediction mode to be used for the intra-picture prediction coding. Since one coding unit corresponds to one component picture and each of the coding units independently determines a prediction mode for the intra-picture prediction coding, it is possible to efficiently code a high-definition picture for professional use. N is assumed to be three in the following description so as to correspond to RGB.

Figure 1:
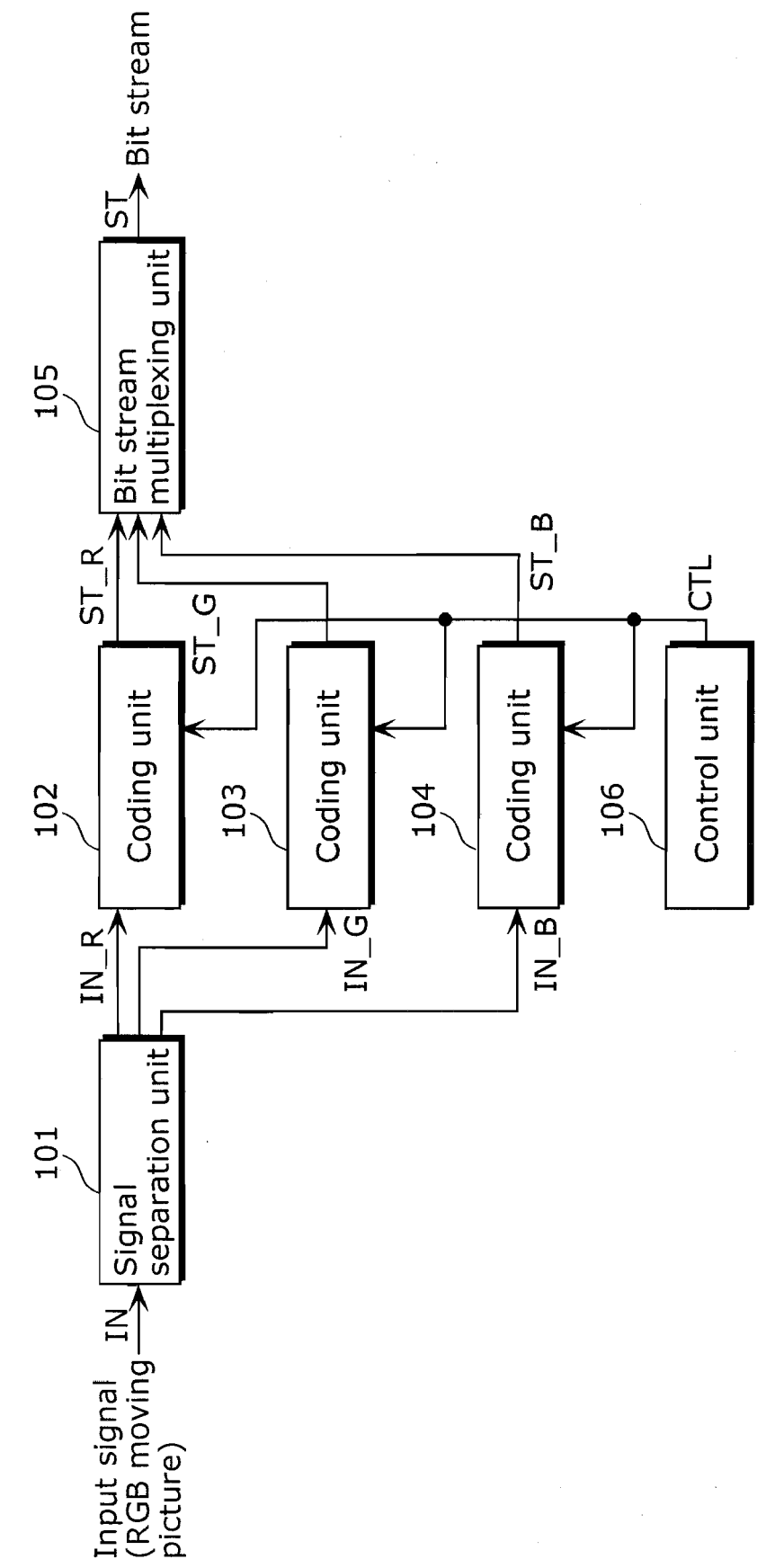
FIG. 1 is a block diagram illustrating an example of a structure of the moving picture coding apparatus according to the first embodiment of the present invention.

FIG. 1 is a block diagram showing an example of a structure of the moving picture coding apparatus according to the first embodiment of the present invention. A moving picture coding apparatus 100 includes a signal separation unit 101, three coding units 102, 103 and 104, a bit stream multiplexing unit 105, and a control unit 106.

Figure 3:
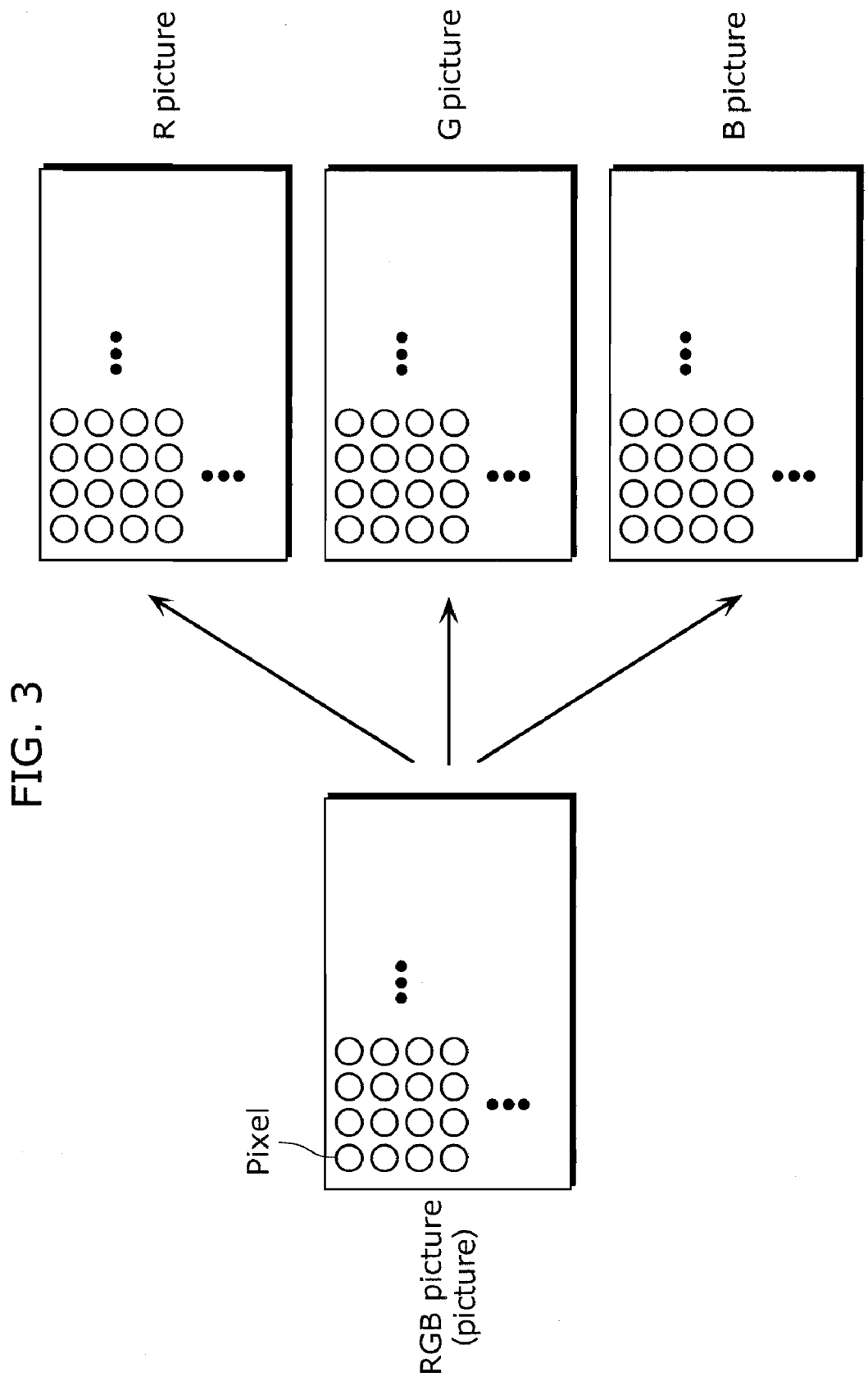
FIG. 3 is a schematic diagram illustrating a format of a RGB 4:4:4 format.

An input signal IN is inputted to the signal separating unit 101. The input signal IN is a moving picture signal of RGB 4:4:4 format. Here, as shown in FIG. 3, the RGB 4:4:4 format is a format in which each pixel is described as a combination of three pixels of R signal, G signal and B signal, and in which each of the R signal, G signal and B signal within a picture has equal number of pixels. For example, in the case where each color pixel of the R signal, G signal and B signal is indicated by 8 bits, one pixel of the RGB signal is indicated by 24 bits.

The input RGB signal IN inputted to the signal separation unit 101 is separated into three signals: an input signal (input picture) IN_R including only R signal; an input signal (input picture) IN_G including only G signal; and an input signal (input picture) IN_B including only B signal. The separated three signals are respectively inputted to the coding units 102, 103 and 104.

Figure 2:
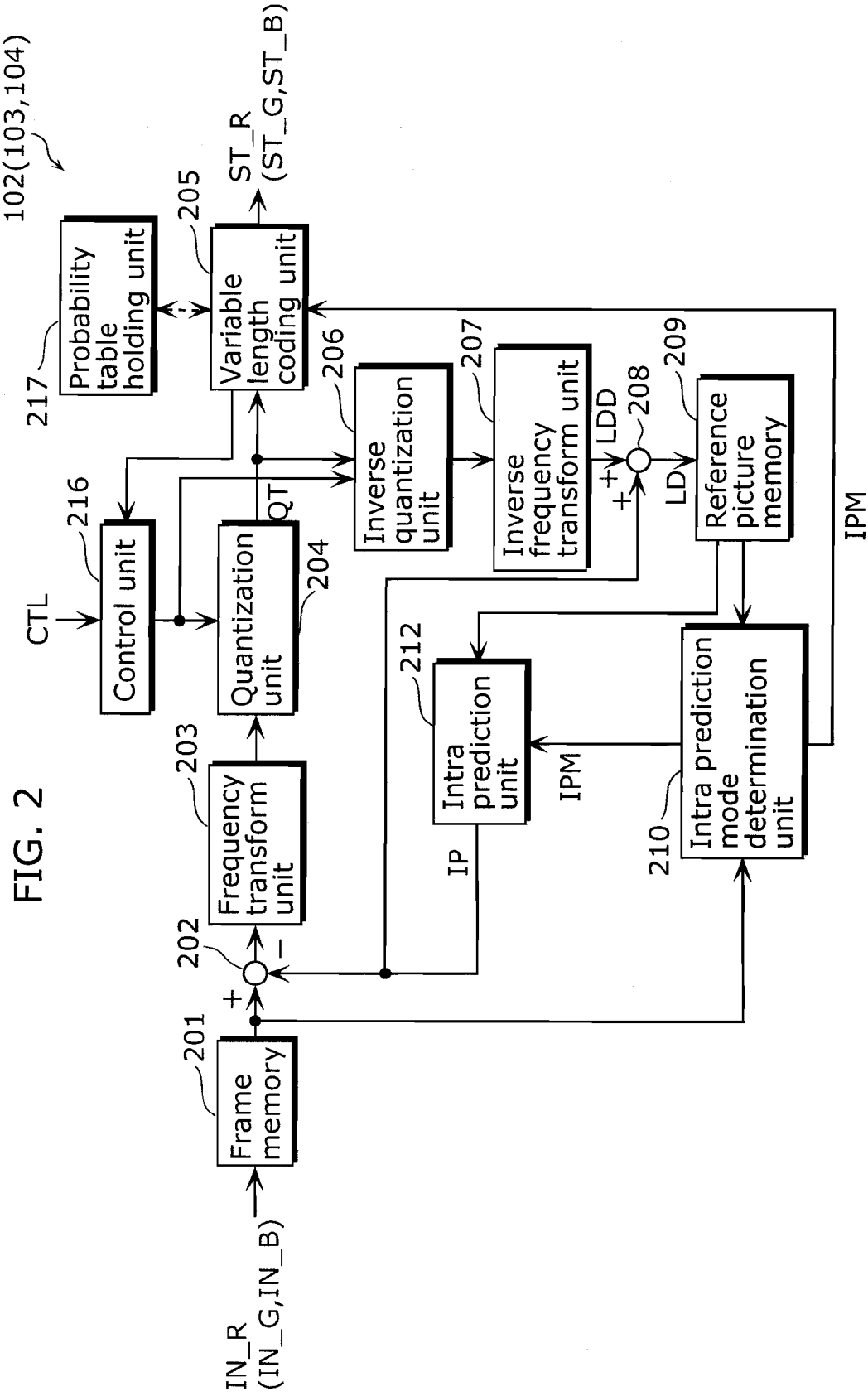
FIG. 2 is a block diagram illustrating a structure of a coding unit.

FIG. 2 shows a structure of each of the coding units 102, 103 and 104. Hereafter, the operation of the coding unit 102 is described which codes the input signal IN_R. However, the structure and the operation are common to the coding unit 103 which codes the input signal IN_G and to the coding unit 104 which codes the input signal IN_B.

As shown in FIG. 2, the coding unit 102 includes a frame memory 201, a subtracting unit 202, a frequency transform unit 203, a quantization unit 204, a variable length coding unit 205, an inverse quantization unit 206, an inverse frequency transform unit 207, an adding unit 208, a reference picture memory 209, an intra prediction mode determination unit 210, an intra prediction unit 212, a control unit 216 and a probability table holding unit 217.

The coding unit 102 codes each picture of the input pictures IN_Rs as an intra-picture prediction coded (Intra) picture.

The input picture IN_R is stored in the frame memory 201 and then outputted from the frame memory 201 on a block unit basis (e.g. in a unit of macro block having horizontal 16 pixels and vertical 16 pixels).

The macro block outputted from the frame memory 201 is inputted to the intra prediction mode determination unit 210. The intra prediction mode determination unit 210 determines how to perform intra-picture prediction coding on the inputted macro block. More specifically, the intra prediction mode determination unit 210 determines an intra prediction block size of the inputted macro block and an intra prediction mode for each block. The intra prediction block size is one of the following sizes: horizontal 4 pixels×vertical 4 pixels; horizontal 8 pixels×vertical 8 pixels; and horizontal 16 pixels× vertical 16 pixels. The intra prediction mode is determined in accordance with an intra prediction mode specified by the MPEG-4 AVC standard.

Figure 4:
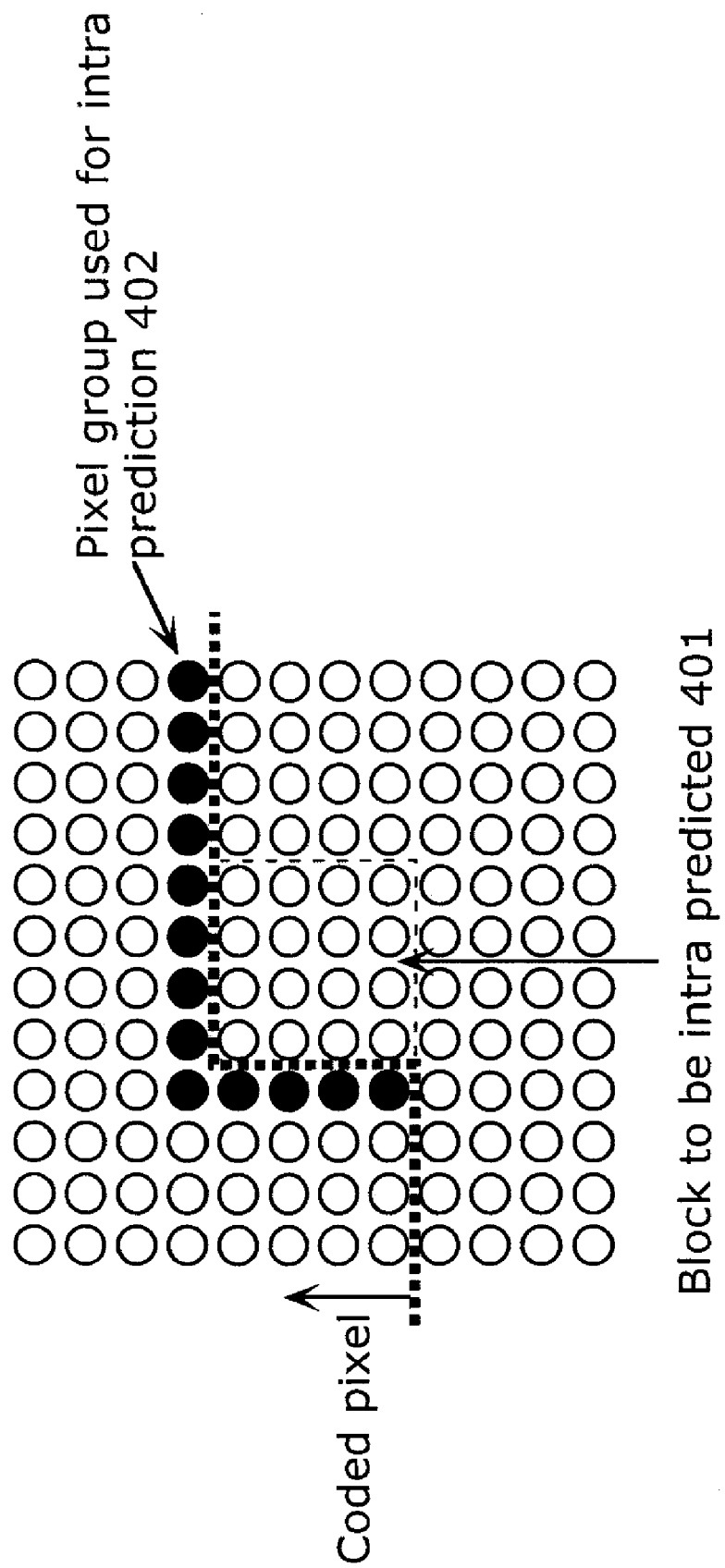
FIG. 4 is a schematic diagram for describing an intra prediction mode.
Figure 12:
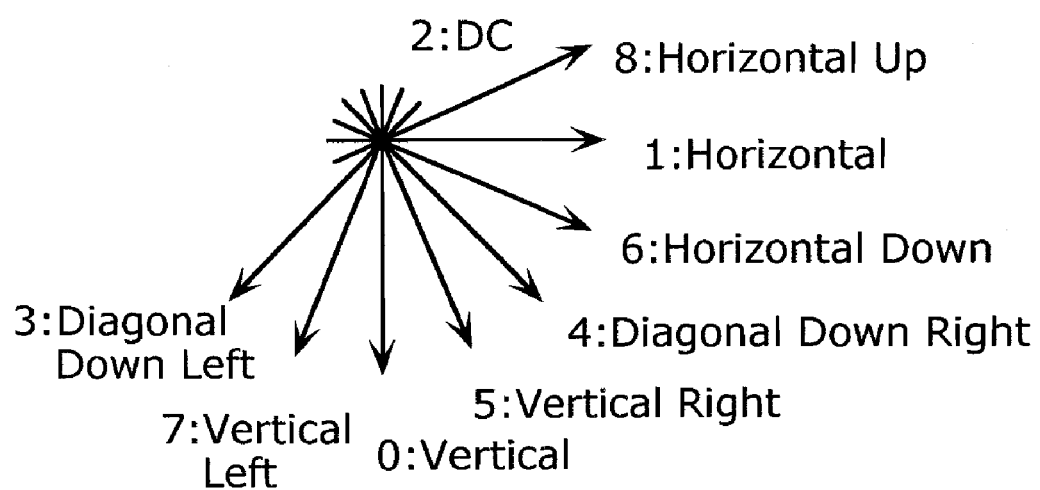
FIG. 12 illustrates prediction modes for the intra prediction mode.

FIG. 4 is a schematic diagram illustrating an intra-picture prediction mode specified by the MPEG-4 AVC standard. In the diagram, it is assumed that peripheral pixels (pixels above the dotted line) to be used for the intra-picture prediction have already been coded and stored in the reference picture memory 209. Black circles of a pixel group 402 in FIG. 4 are used for performing the intra-picture prediction on an intra prediction current block 401 of 4 pixels×4 pixels. An intra prediction mode is determined for each block. For example, a prediction mode is determined from among nine different intra prediction modes for a block of horizontal 4 pixels× vertical 4 pixels. Furthermore, a prediction mode is determined from among four different intra prediction modes for a block of horizontal 16 pixels×vertical 16 pixels. FIG. 12 illustrates prediction modes for an intra prediction block of horizontal 4 pixels×vertical 4 pixels.

One of a block size of: horizontal 4 pixels×vertical 4 pixels; horizontal 8 pixels×vertical 8 pixels; and horizontal 16 pixels×vertical 16 pixels is determined as an intra prediction size.

FIG. 12 is a schematic diagram illustrating prediction directions using the pixel group 402 shown in FIG. 4. A prediction mode 0 is a mode in which pixels underneath the pixel group 402 are predicted in a vertical direction. Similarly, as each prediction direction: a prediction mode 1 indicates a horizontal direction; a prediction mode 3 indicates a diagonal down left direction; a prediction mode 4 indicates a diagonal down right direction; a prediction mode 5 indicates a vertical right direction; a prediction mode 6 indicates a horizontal down direction; and a prediction mode 7 indicates a vertical right direction. The mode 2 indicates not a direction but an average as a prediction value. Note that there are four different intra prediction modes for a block of horizontal 16 pixels×vertical 16 pixels.

An intra prediction mode (IPM) determined by the intra prediction mode determination unit 210 is outputted to the intra prediction unit 212 and the variable length coding unit 205. The intra prediction unit 212 determines an intra prediction block size and a prediction mode for each block, based on the intra prediction mode IPM determined by the intra prediction mode determination unit 210. Furthermore, the intra prediction unit 212 generates an intra prediction picture IP by obtaining an intra reference pixel from the reference picture memory 209, and outputs the generated IP to the subtracting unit 202.

The subtracting unit 202 receives the macro block of the input picture from the frame memory 201 and the intra predictive image IP generated by the intra prediction unit 212, generates a differential image between the input picture and the intra predictive image IP, and outputs the differential image to the frequency transform unit 203.

The frequency transform unit 203 performs frequency transformation on the differential image generated by the prediction unit 212, and outputs frequency transform coefficients.

The quantization unit 204 performs quantization of the frequency transform coefficients generated by the frequency transform unit 203, and outputs the quantized frequency transform coefficients QT. Here, the quantization is a process of dividing the frequency transform coefficients by a predetermined value (quantization step). It is assumed that this quantization step is given by the control unit 216 (the quantization step may be included in a control signal CTL from the control unit 106). The quantized frequency transform coefficients QT are outputted to the variable length coding unit 205 and the inverse quantization unit 206.

The quantized frequency transform coefficients QT are processed in inverse quantization by the inverse quantization unit 206, are further processed in inverse frequency transformation by the inverse frequency transform unit 207, and become a decoded differential image LDD. The decoded differential image LDD is added to the intra predictive image IP in the adding unit 208, becomes a decoded image LD, and stored in the reference picture memory 209. The decoded image LD stored in the reference picture memory 209 is used in the later coding as a reference picture.

The variable length coding unit 205 performs variable length coding on the quantized frequency transform coefficients QT inputted from the quantization unit 204, an intra prediction mode IPM inputted from the intra prediction mode determination unit 210 and the like, and outputs a bit stream ST_R.

Here, as a method for the variable length coding method used in the variable length coding unit 205, there is a context adaptive arithmetic coding method adopted in the international standard moving picture coding method H.264. The context adaptive arithmetic coding method is a method for switching the probability tables used for arithmetic coding according to the variable length coding target data and data on which the variable length coding has already been performed (context adaptation). For example, as a context for performing variable length coding of the quantized frequency transform coefficients QT, a block size for intra prediction and a block size for frequency transformation and the like are used. Here, it is assumed that the probability tables are held in the probability table holding unit 217.

The coding units 102, 103 and 104 respectively output the bit streams ST_R, ST_G and ST_B, and input them to the bit stream multiplexing unit 105. The bit stream multiplexing unit 105 multiplexes the inputted three bit streams ST_R, ST_G and ST_B into one bit stream ST, and outputs the ST. In this case, the bit stream multiplexing unit 105 inserts, into a bit stream signal, mode information indicating a prediction mode of a component picture. As a method for multiplexing three bit streams and mode information into a bit stream, there are methods, such as a method for multiplexing data on a block or a macro block unit basis and on a picture or a slice unit basis. Examples of such multiplexing are illustrated in FIGS. 5A and 5B.

FIG. 5A illustrates a data stream indicating mode information and three bit streams which are multiplexed on a macro block unit basis. As such, the multiplexing method on a block or macro block unit basis has an effect of having an almost the same bit stream structure as the bit stream structure of the conventional bit stream obtained by coding the YUV pictures.

FIG. 5B illustrates a data stream indicating mode information and three bit streams which are multiplexed on a slice unit basis. Furthermore, when multiplexing data on a picture or slice unit basis, a unit for multiplexing becomes larger. As a result, there is an effect that the number of switching processes of bit streams for the multiplexing processing can be reduced, and the multiplexing processing can be simplified.

Furthermore, information (flag) indicating that each of the R, G, and B signals is independently coded may be described in the bit stream. This information may be a flag indicating that a prediction mode is independently determined for intra-picture prediction, and may be information, in the bit streams, indicating a prediction mode for performing intra-picture prediction on RGB signals. The information (flag) has only to be described in a header of the whole sequence or in an additional information unit. FIG. 5C shows an example of a structure of the bit stream for this case. With this, when a decoding apparatus decodes the bit stream, it can be easily judged whether or not each of the RGB signals can be decoded individually.

As described in the above, the moving picture coding apparatus of the present invention separates an input moving picture of RGB 4:4:4 format into R signal, G signal and B signal, and performs intra-picture prediction coding on each of the signals, using respective coding units for each signal. Herein, in the intra prediction at the time of coding each signal, an intra prediction mode is determined respectively for each signal. Further, in variable length coding using arithmetic coding when coding each signal, a probability table is held respectively by each signal (a probability table is not commonly used among signals).

Through such operations, coding can be performed completely independently for each signal (coding units do not need to transfer data, information and the like mutually each other) so that the structure of the coding apparatus can be simplified without reducing the coding efficiency. For example, in the case where it is difficult to process for single coding apparatus a very large number of pixels of an input signal (e.g. in the case where the input picture has pixels equal to or more than the pixels in the HDTV picture), the present invention is very useful. Also, in this case, each of the RGB signal has the same number of pixels so that the respective coding units of each signal can have the same hardware structure. Furthermore, in the case where the intra prediction mode is determined respectively for each signal, information indicating the intra prediction mode is respectively described in each signal as a bit stream structure. Accordingly, the RGB signals can be decoded respectively also when decoding the bit stream so that there is an effect that the decoding process is simplified.

It should be noted that, while in the present embodiment, the input picture of RGB 4:4:4 format, that is a picture having three color elements, is described, coding process can be performed in the same structure for the number of color elements even in the case where the color elements include other than the three colors (e.g. four colors, six colors and the like). Therefore, the same effect as obtained in the present embodiment can be obtained.

(First Variation)

The first variation according to the first embodiment is to be described. In this variation, a moving picture coding apparatus including three coding units each of which can perform not only intra-picture prediction coding but also inter-picture prediction coding is to be described. In coding of a moving picture, each of the three coding units independently determines a prediction mode for intra-picture prediction coding, and independently determines a motion vector for inter-picture prediction coding.

The moving picture coding apparatus according to the first variation further includes coding units 102a, 103a, and 104a, instead of the coding units 102, 103, and 104. The coding units 102a, 103a, and 104a selectively perform the intra-picture prediction coding and inter-picture prediction coding.

Figure 6:
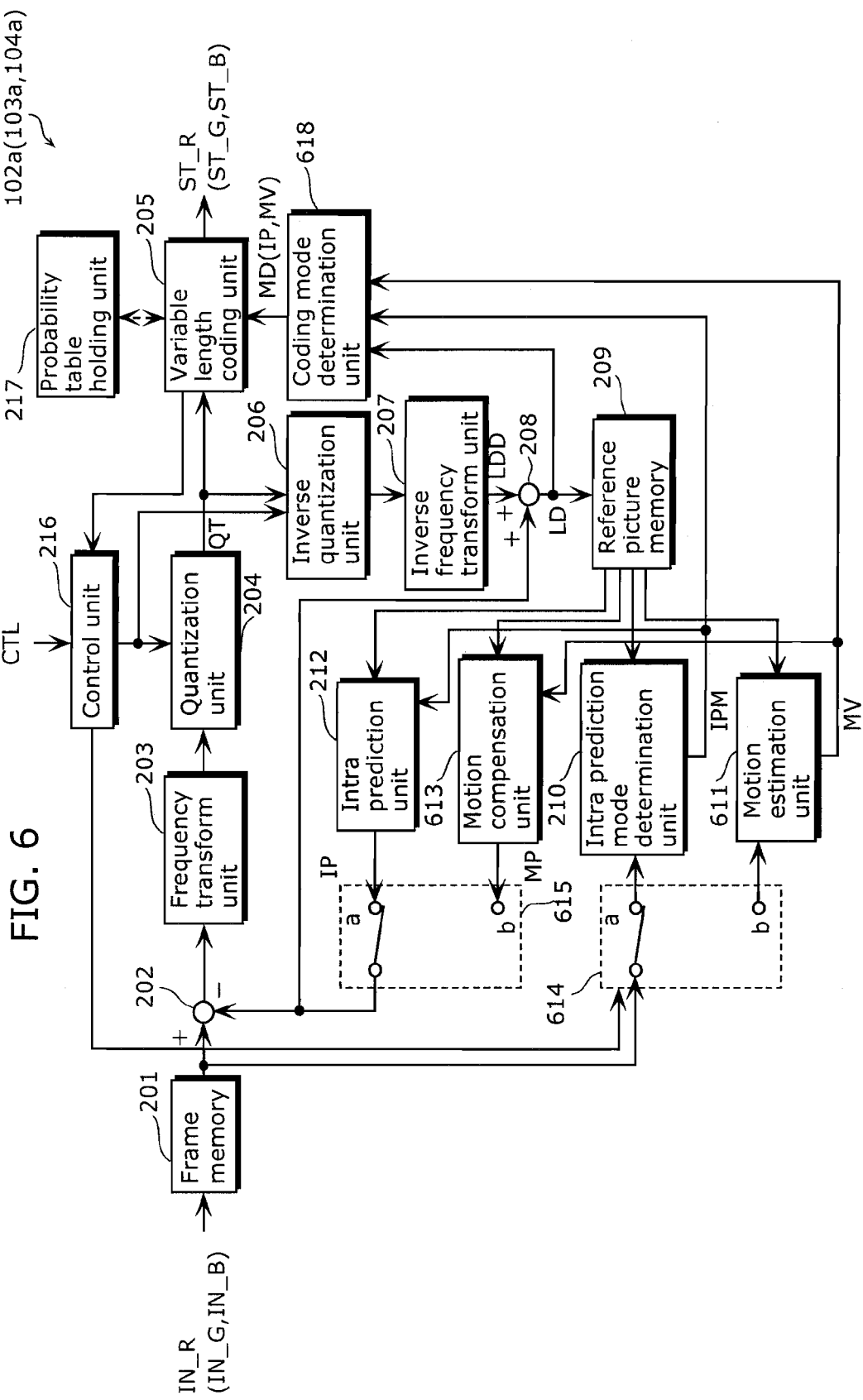
FIG. 6 is a block diagram illustrating a structure of a coding unit in the first variation according to the first embodiment.

FIG. 6 is a block diagram illustrating a structure of the coding unit 102a (or one of coding units 103a and 104a). The coding unit 102a includes a motion estimation unit 611, a motion compensation unit 613, switches 614 and 615, and a coding mode determination unit 618, in addition to the units of the coding unit 102 shown in FIG. 2.

The coding unit 102a is different from the coding unit 102 in that the coding unit 102 codes each picture of the input pictures IN_R as an intra-picture prediction coded picture, whereas the coding unit 102a codes each picture of the input pictures IN_R as an inter-picture prediction coded picture.

A processing method used in the coding unit 102a when coding each picture of the input pictures IN_R as an intra-picture prediction coded picture is the same as the processing method described in the first embodiment. Therefore, the description is omitted here.

An operation when coding a picture of the input pictures IN_Rs as an inter-picture prediction coded picture is described hereinafter.

The input pictures IN_Rs are first stored in the frame memory 201, and then outputted from the frame memory 201 on a block unit basis (e.g. in a unit of macro block having horizontal 16 pixels and vertical 16 pixels).

The macro block outputted from the frame memory 201 is inputted to the intra prediction mode determination unit 210 (the switch 614 is connected to "a" by the control unit 216). In this case, since the operations in the intra prediction mode determination unit 210 and the intra prediction unit 212 are the same as those in the first embodiment, the description is omitted. The intra prediction mode is outputted to the intra prediction unit 212 and the coding mode determination unit 618.

The macro block again outputted from the frame memory 201 is inputted to the intra prediction mode determination unit 611 (the switch 614 is connected to "b" by the control unit 216). The motion estimation unit 611 estimates, for the inputted macro block, the motion amount (motion vector) with respect to the reference picture (a coded picture that is held in the reference picture memory 209 and is different from the picture to be coded). In the motion estimation, generally, the motion vector having the minimum weighted sum of: a differential value between the block to be coded and a predictive image (an image in the reference picture referred by the motion vector); and an amount of codes for the motion vector is selected. The estimated motion vector is outputted to the motion compensation unit 613 and the coding mode determination unit 205.

The motion compensation unit 613 generates a predictive image MP by obtaining inter reference pixels from the reference picture memory 209 based on the motion vector determined by the motion estimation unit 611, and outputs the predictive image MP to the subtracting unit 202 (the switch 615 is connected to "b" by the control unit 216).

The processing performed by the subtracting unit 202, the frequency transform unit 203, the quantization unit 204, the inverse quantization unit 206, the inverse frequency transform unit 207, and the adding unit 208 is the same as the processing described in the first embodiment. Therefore, the description about the processing is omitted here.

The coding mode determination unit 618 determines a coding mode of a macro block to be coded using outputs from the intra prediction mode determination unit 210, motion estimation unit 611, quantization unit 204, frame memory 201, and adding unit 208, and the like. Here, it is determined which one of the intra-picture prediction coding and the inter-picture prediction coding is used for coding the macro block to be coded. In general, the coding mode having the small weighted sum of the amount of bits to be generated and the coded distortion is selected. In the case where the intra-picture prediction coding is selected as the coding mode, the information indicating the intra prediction mode IPM is outputted to the variable length coding unit 205. In the case where the inter-picture prediction coding is selected as a coding mode, the motion vector MV and the coding mode MD are outputted to the variable length coding unit 205.

The variable length coding unit 205 performs variable length coding on: the quantized frequency transform coefficients QT inputted from the quantization unit 204; and the coding mode MD, and the intra prediction mode IPM or the motion vector MV which are outputted from the coding mode determination unit 618, and outputs the bit stream ST_R.

Here, in the case where the variable length coding unit 205 codes the motion vector MV using a context adaptive arithmetic coding method, a method for changing a probability table depending on a size (context) of the motion vector of the coded peripheral block can be used. Here, it is assumed that the probability tables are held in the probability table holding unit 217.

The bit streams ST_R, ST_G, and ST_B respectively outputted from the coding units 102a, 103a, and 104a are inputted to the bit stream multiplexing unit 105. The bit stream multiplexing unit 105 multiplexes three bit streams ST_R, ST_G, and ST_B into one bit stream ST, and outputs the bit stream ST. Here, as a method for multiplexing three bit streams into one bit stream, there are a method for multiplexing bit streams in a unit of block or macro block, and a method for multiplexing bit streams in a unit of picture or slice.

FIG. 5D illustrates a data stream in which motion vector information and three bit streams are multiplexed on a macro unit basis. In the case where the bit streams are multiplexed in a unit of block or macro block, there is an effect that the multiplexed bit stream has the same structure as the bit stream obtained by coding the conventional YUV pictures. Furthermore, the bit streams may be multiplexed on a picture or a slice unit basis. In this case, since the unit for multiplexing becomes large, there is an effect that the number of switching processes of bit streams for the multiplexing processing can be reduced, and the multiplexing processing can be simplified. The bit stream structure herein is the same as the structure shown in FIG. 5B, and motion vector information is inserted in each slice header.

Further, information (flag) indicating that each of the R, G, and B signals is independently coded (indicating that a motion vector is determined independently or indicating that the motion vector for each signal is respectively described in the bit stream) may be described in the bit stream. The information (flag) has only to be described in a header of a whole sequence or an additional information unit. FIG. 5C shows an example of a bit stream structure for this case. Accordingly, when the decoding apparatus decodes the bit stream, whether it can decode each of the RGB signals independently can be easily judged.

As described in the above, the moving picture coding apparatus of the present invention receives a moving picture of RGB 4:4:4 format as an input picture, separates R signal, G signal and B signal from the input signal, and performs intra prediction coding of each signal using respective coding unit for each signal. Herein, the motion vector used for motion prediction for coding each signal is determined independently for each signal. Further, in the case where arithmetic coding is used for variable length coding for coding each signal (e.g. when the motion vector is coded), a probability table is held respectively by each signal (a probability table is not commonly used among signals).

Through such operations, coding can be performed completely independently for each signal (coding units do not need to transfer data, information and the like mutually each other). Therefore, in the case where single coding apparatus cannot perform coding because the number of pixels to be processed is very large as in the moving picture having the degree of resolution equal to or more than the HDTV, the coding process can be realized in real time by coding each signal in parallel. Also, the structure of the coding apparatus and the processing details herein can be simplified. Also, in this case, each of the RGB signal has the same number of pixels so that the respective coding unit of each signal can have the same hardware structure. Furthermore, in the case where the motion vector is determined respectively for each signal, information indicating the motion vector is respectively described in each signal within a bit stream. Accordingly, the RGB signals can be decoded respectively when decoding the bit stream so that there is an effect that the decoding process is simplified.

(Second Variation)

In the first variation, the moving picture coding apparatus in that each of the three coding units independently determines a prediction mode for intra-picture prediction coding and independently determines a motion vector for inter-picture prediction coding is described. In the present variation, the moving picture coding apparatus in that one of the three coding units determines a motion vector for inter-picture prediction coding and the inter-picture prediction coding is performed by commonly using the motion vector determined by the three coding units is to be described. The second variation is the same as the first variation in that the each of the three coding units independently determines a prediction mode for intra-picture prediction coding.

Figure 7:
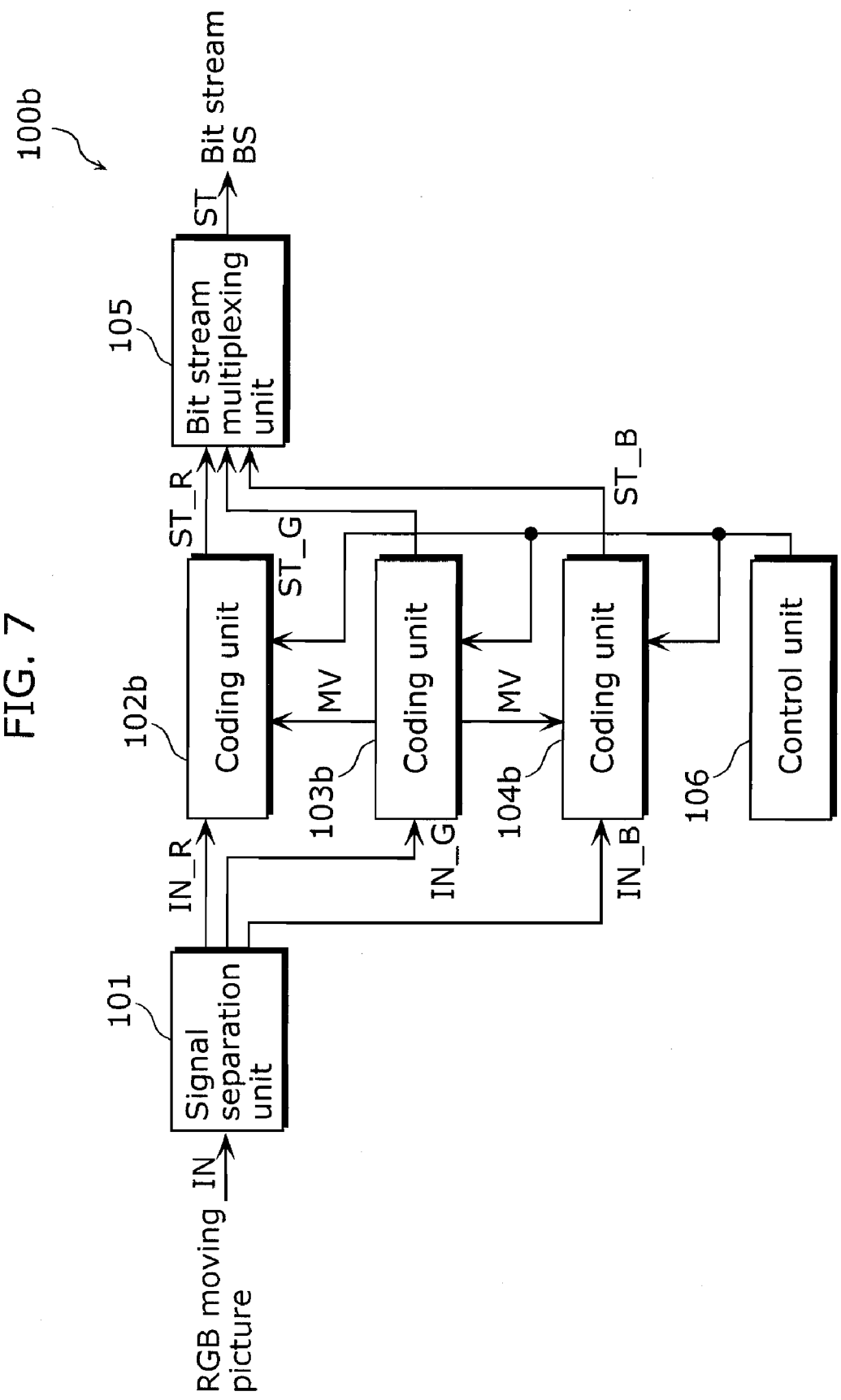
FIG. 7 is a block diagram illustrating an example of a structure of the moving picture coding apparatus in the second variation according to the first embodiment.

FIG. 7 is a block diagram showing an example of a structure of the moving picture coding apparatus in the second variation. The moving picture coding apparatus 100b has almost the same structure as that of the moving picture coding apparatus 100 described in the first embodiment. However, it differs from the moving picture coding apparatus 100 in that the moving picture coding apparatus 100*b* includes the coding units 102*b*, 103*b*, and 104*b* instead of the coding units 102, 103, and 104, and the coding units 102*b*, 103*b*, and 104*b* pass information each other. Furthermore, the structures are slightly different between the coding unit 103*b* which processes a G signal and the coding units 102*b* and 104*b* which process other signals (R signal and B signal). In other words, the structure of the second variation specifies that the coding unit 103*b* which processes a G signal notifies the coding units 102*b* and 104*b* which process other signals (R signal and B signal) respectively of a coding mode MD indicating either the intra-picture prediction coding or inter-picture prediction coding, and of a motion vector MV used for the inter-picture prediction coding.

Figure 8:
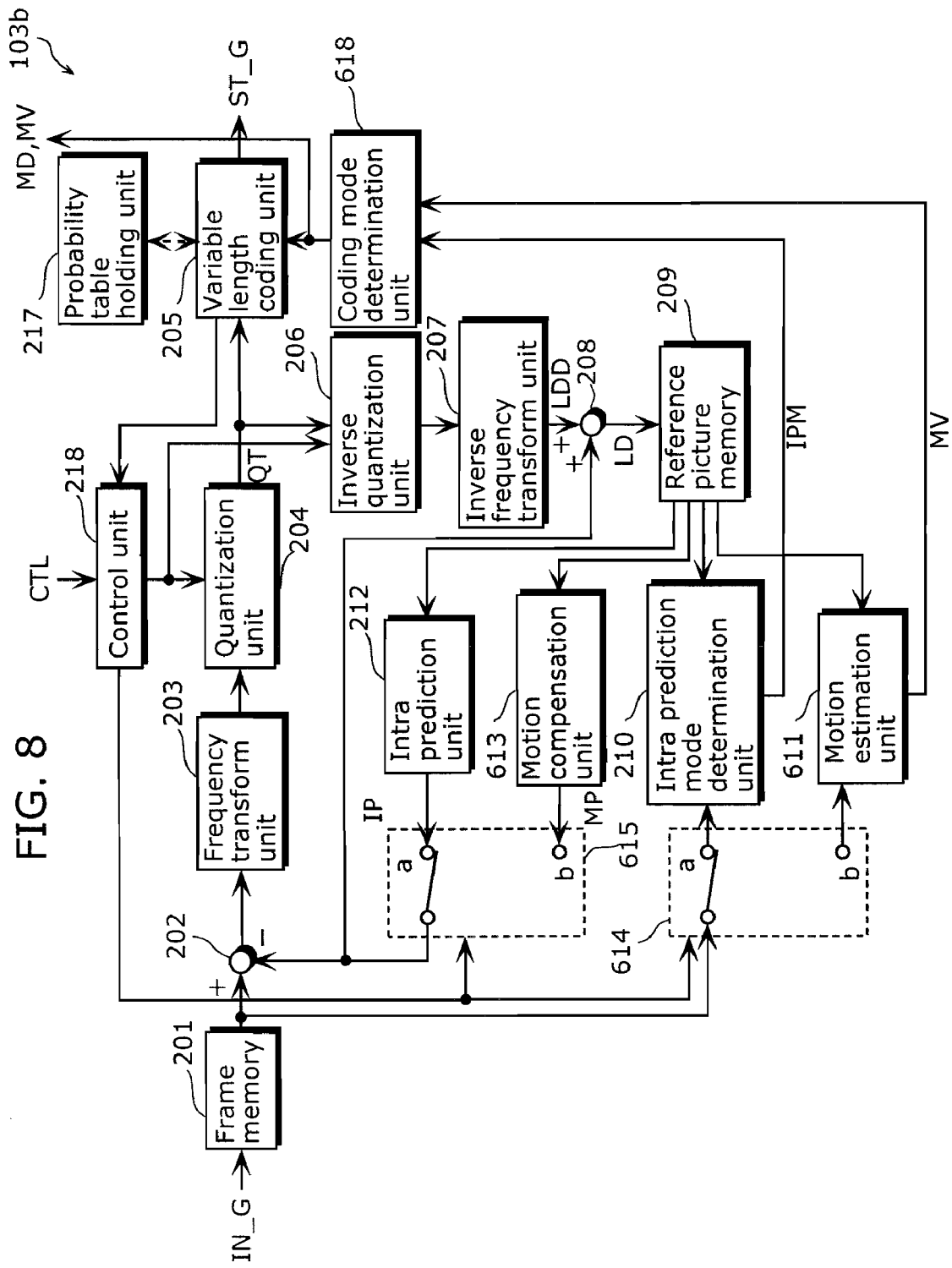
FIG. 8 is a block diagram illustrating an example of a structure of a coding unit that codes a G signal.

FIG. 8 is a block diagram showing an example of a structure of the coding unit 103*b* which codes the G signal. The coding unit 103*b* has the same structure as the coding unit 102*a* shown in FIG. 6 according to the first embodiment. However, it differs in that it outputs the coding mode MD and motion vector MV (only in the case of inter-picture prediction mode) that are determined by the coding mode determination unit 618, to the coding units 102*b* and 104*b*.

Figure 9:
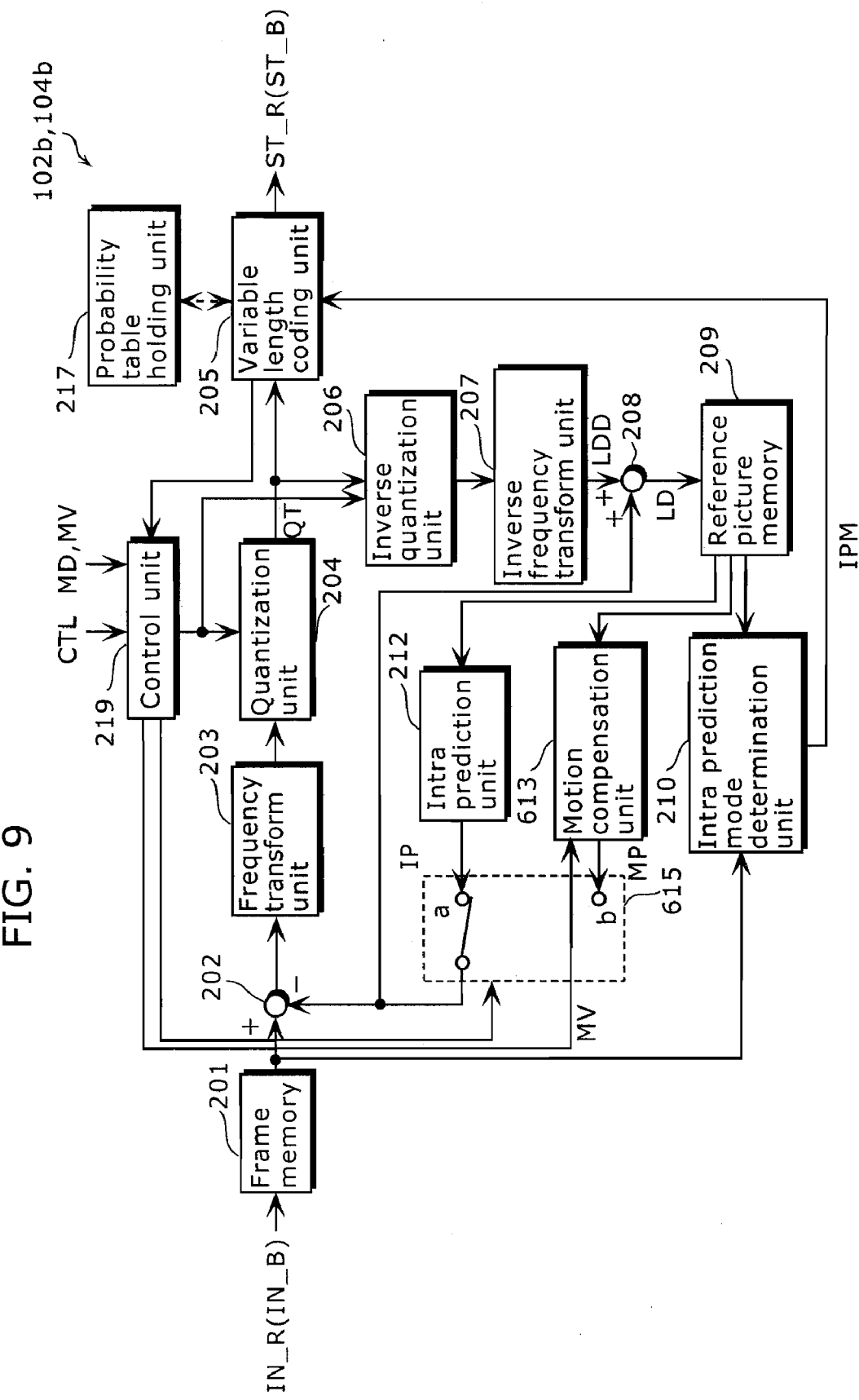
FIG. 9 is a block diagram illustrating an example of a structure of a coding unit that codes a R (or B) signal.

FIG. 9 is a diagram showing an example of a structure of the coding unit 102*b* (or 104*b*) which codes the R signal (or B signal). The coding unit 102*b* has the same structure as the coding unit 102*a* shown in FIG. 6 according to the first embodiment. However, the following two points are different. First, it does not have the motion estimation unit 611. Second, it performs coding using the coding mode MD and motion vector MV (only in the case of inter-picture prediction coding mode) that are inputted from the coding unit 103*b* to the control unit 216. The details are described in the following.

In the case where the coding mode MD is the intra-picture prediction coding mode, the intra prediction mode determination unit 210 determines the intra prediction mode, and the inter prediction unit 212 generates the inter predictive image (the switch 615 is connected to "a"). The method for coding the differential image between the input picture and the predictive image is the same as the method described in the first embodiment. The intra prediction mode IPM is outputted to the variable length coding unit 205 and is described in the bit stream.

In the case where the coding mode MD is the inter-picture prediction coding mode, the motion vector MV is outputted to the compensation unit 613. Also, the switch 615 is connected to "b". The motion compensation unit 613, based on the inputted motion vector, obtains inter-picture reference pixels from the reference picture memory 209, generates a predictive image MP, and outputs the predictive image MP to the subtracting unit 202 via the switch 615. The method for coding the differential image between the input picture and the predictive image is the same as the method described in the first embodiment. However, the coding mode MD and the motion vector MV are not described in the bit stream (the coding mode MD and the motion vector MV are described in the bit stream ST_G outputted by the coding unit 103*b*).

Figure 5:
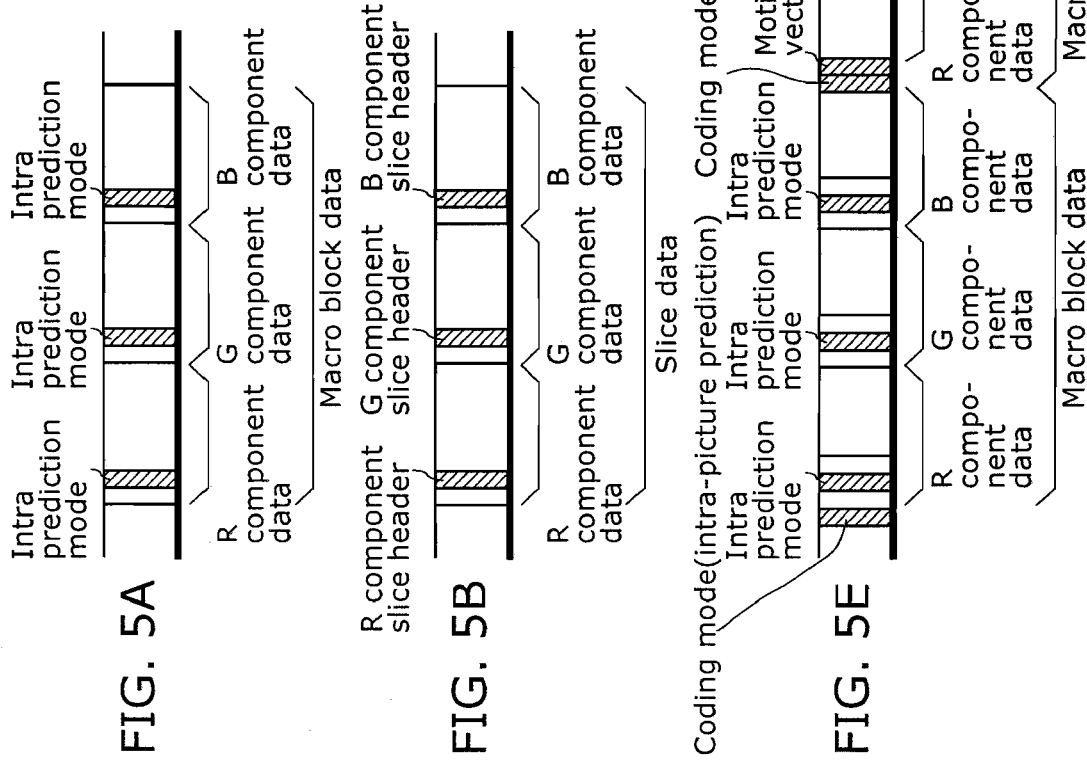
FIG. 5A illustrates a data stream indicating mode information and three bit streams which are multiplexed on a macro block unit basis.
FIG. 5B illustrates a data stream indicating mode information and three bit streams which are multiplexed on a slice unit basis.
FIG. 5C illustrates a bit stream including information (a flag) indicating that the inter-picture prediction coding has been independently performed.
FIG. 5D illustrates a schematic diagram of a format of a data stream.
FIG. 5E illustrates a schematic diagram of a format of a data stream.

The bit streams ST_R, ST_G and ST_B outputted from the coding units 102*b*, 103*b* and 104*b* are inputted to the bit stream multiplexing unit 105. The bit stream multiplexing unit 105 multiplexes the inputted three bit streams ST_R, ST_G and ST_B into one bit stream and outputs the bit stream. Here, as a method for multiplexing the three bit streams into one bit stream, there are methods, such as a method for multiplexing bit streams in a unit of block or macro block and a method for multiplexing bit streams in a unit of picture or slice. In the case where the bit streams are multiplexed in a unit of block or macro block, there is an effect that the multiplexed bit stream has the same bit stream structure as the bit stream obtained by coding the conventional YUV pictures. FIG. 5 (*e*) shows an example of a bit stream structure for this case. In this case, the order within the bit stream is changed so that the coding mode MD and the motion vector MV described in the bit stream ST_G are described in a head of a block or a macro block. Also, when multiplexing bit streams in a unit of picture or slice, since the unit for the multiplexing processing becomes large, there is an effect that the number of switching processes of bit streams for the multiplexing processing can be reduced, and the multiplexing processing can be simplified. The bit stream structure herein is the same as the structure shown in FIG. 5 (*b*). Further, information (flag) may be described in the bit stream, the information indicating that the intra prediction is determined independently for each of the RGB signals (an intra prediction mode for each signal is independently described in the bit stream); and the motion vector is commonly used by the RGB signals (the common motion vector for the RGB signals is described in the bit stream). The information (flag) has only to be described in a header of the whole sequence or in the additional information unit. FIG. 5 (*c*) shows an example of a bit stream structure for this case. Accordingly, when the decoding apparatus decodes the bit stream, it can be easily judged that the intra prediction is independently described for each signal and the motion vector is commonly used by the signals and described.

As described in the above, the moving picture coding apparatus of the present invention receives a moving picture of RGB 4:4:4 format as an input picture, separates the input signal into an R signal, a G signal and a B signal, and codes each signal using the intra-picture prediction coding and the inter-picture prediction coding. Herein, the coding mode (indicating which one of the intra-picture prediction coding and the inter-picture prediction coding is used) determined by the first signal (e.g. G signal) is also used for coding the second signal (e.g. R signal and B signal). In the case where the coding mode is the intra-picture prediction coding, the intra picture prediction method is determined independently for each signal. Further, in the case where the inter-picture prediction coding, the motion vector determined for the first signal (G signal) is used. Then, the coding mode and the motion vector determined for the first signal on one coding unit basis (e.g. macro block) are only described in the bit stream. Also, the intra prediction mode determined for each signal is described in the bit stream.

Through such operation, in the intra-picture prediction coded macro block within the intra-picture prediction coded picture or within the inter-picture prediction coded picture, coding is performed completely independently for each signal, while in the inter-picture prediction coded macro block, the motion vector determined for the first signal is commonly used. In general, in the intra-picture prediction coded macro block, while the amount of codes for the quantization frequency transform coefficients occupies a considerable amount of codes to be generated, the amount of information of the intra prediction mode is small. In addition, the amount of processing for determining the intra prediction mode is relatively small. Further, in the inter-picture prediction coded macro block, the amount of codes for the motion vector has the high percentage of the total amount of codes to be generated. Further, in the inter-picture prediction coding, the amount of processing for the motion estimation occupies the majority of the total amount of processing. Therefore, in the processing of the present intra-picture coded picture, the structure (processing) of the coding apparatus can be simplified without reducing the coding efficiency. At the same time, in the processing of inter-picture prediction coded picture, although the structure (processing) of the coding apparatus is slightly complicated (because communication among coding units of respective signals is necessary), the amount of processing for the coding units as a whole can be largely reduced (because the processing of motion estimation is performed only on one signal), and the coding efficiency can be increased (because the number of motion vectors described in the bit stream becomes less).

It should be noted that, in the second variation, the coding mode and motion vector obtained in the coding process of a G signal are used for coding other signals (R signal and B signal). However, the coding mode and the motion vector can be determined using the R signal and B signal, and the similar effect as in the present invention can be obtained for this case.

Furthermore, although the present embodiment describes a case where a picture of RGB 4:4:4 format is used, the present invention can be applied even in the case where the picture is in RGB 4:2:2 format or in RGB 4:2:0 format.

Second Embodiment

The present embodiment describes a moving picture coding apparatus including: three coding units in which prediction modes for intra-picture prediction coding are used individually or a prediction mode is used commonly; and a signal multiplexing unit that inserts, into a bit stream signal, coding information indicating correspondence between three component pictures and the prediction modes for the intra-picture prediction coding. For prediction coding, this moving picture coding apparatus selects one of the following: (1) each of three coding units independently determines a prediction mode; (2) two coding units use a common prediction mode and one coding unit uses an independent prediction mode; and (3) three coding units commonly use a prediction mode. Furthermore, for notifying a decoding apparatus of one of (1) to (3), the coding information includes the number of prediction modes and one or more of identifiers of the prediction modes, and further includes assignment information indicating component pictures to which a common prediction mode is assigned when the prediction mode common to the color component pictures exists in the coding information.

Figure 10:
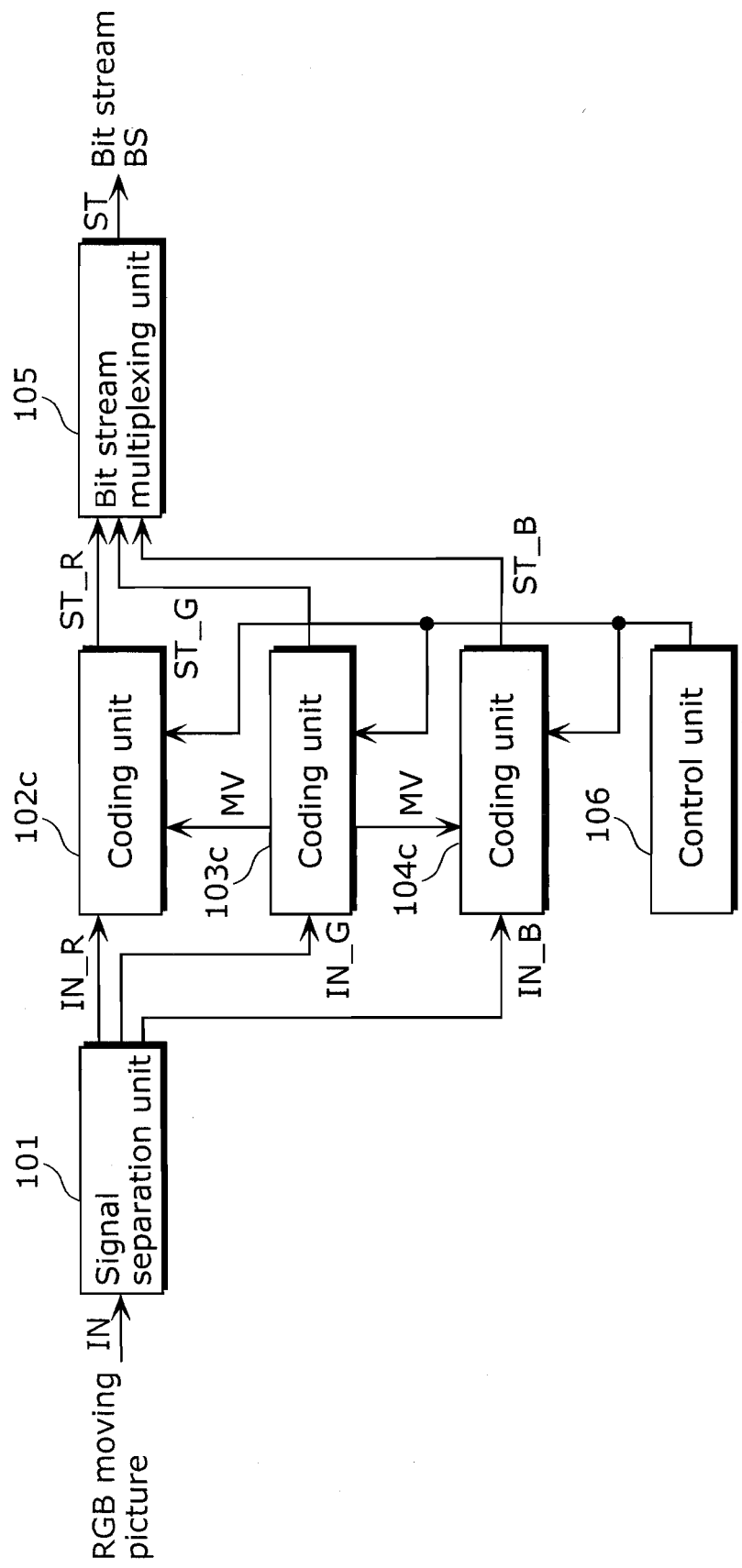
FIG. 10 is a block diagram showing an example of a structure of the moving picture coding apparatus in the second embodiment.

FIG. 10 is a block diagram illustrating an example of a structure of the moving picture coding apparatus in the second embodiment. The moving picture coding apparatus 100c has almost the same structure as that of the moving picture coding apparatus 100 described in the first embodiment. However, it differs from the moving picture coding apparatus 100 in that the moving picture coding apparatus 100c includes the coding units 102c, 103c, and 104c instead of the coding units 102, 103, and 104, and the coding units 102c, 103c, and 104c pass information each other. The coding units 102c, 103c, and 104c have the same structure, and they notify a coding mode MD indicating either the intra-picture prediction coding or inter-picture prediction coding, a motion vector MV used for the inter-picture prediction coding, and a prediction mode IPM for the intra-picture prediction coding each other.

Figure 11:
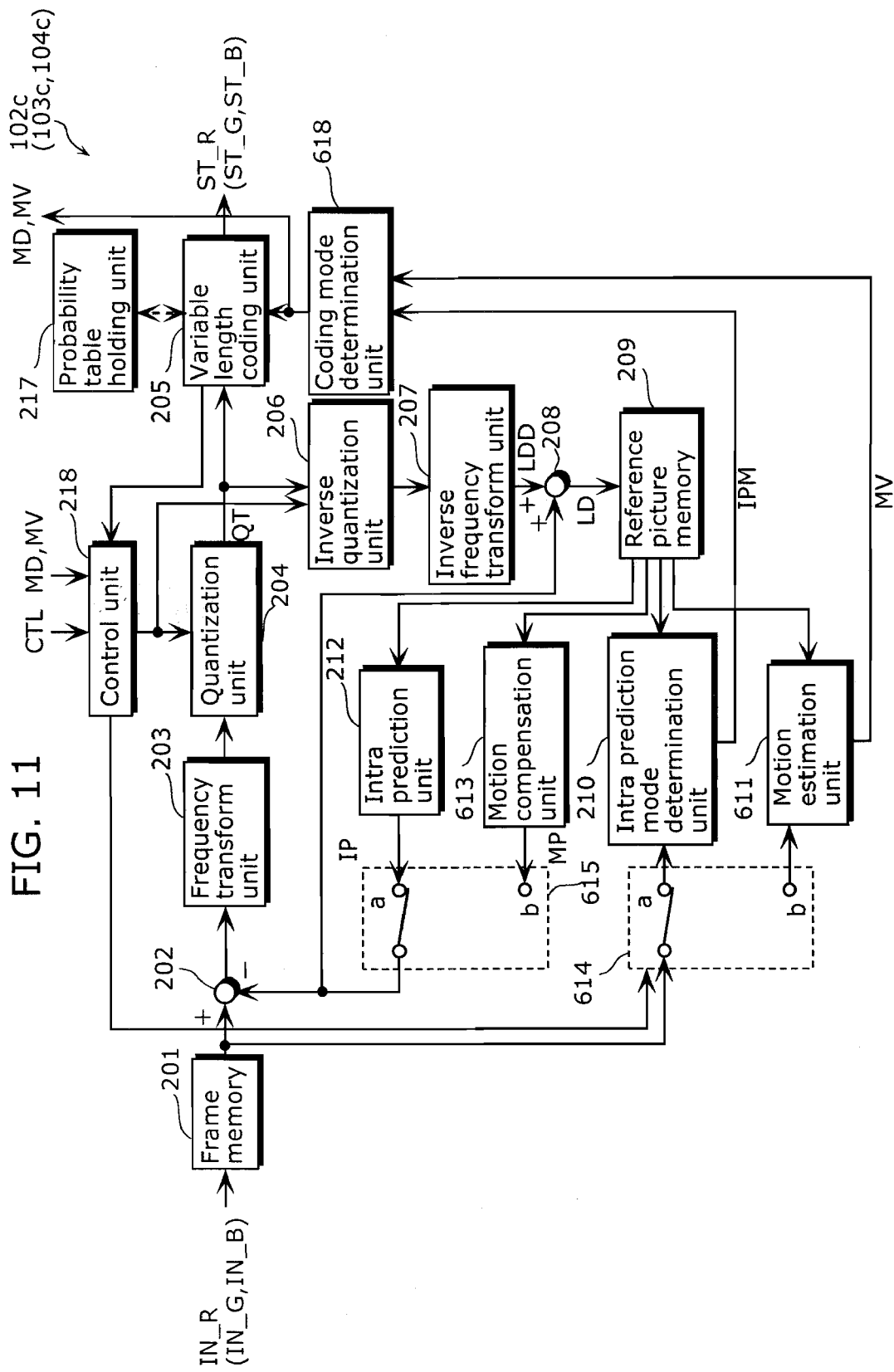
FIG. 11 is a block diagram illustrating a structure of a coding unit.

FIG. 11 is a block diagram illustrating a structure of the coding unit 102c (alternatively, 103c or 104c). The diagram differs from FIG. 8 in: that the coding mode determination unit 618 transmits, to the coding units 103c and 104c, the prediction mode IPM for the intra-picture prediction coding, in addition to the coding mode MD and the motion vector MV; that a control unit 218 receives, from the coding units 103c and 104c, the prediction mode IPM for the intra-picture prediction coding; and the operation in the control unit 218.

The control unit 218 independently determines, according to an extraneous instruction or a predetermined setting, a prediction mode for the intra-picture prediction coding, or determines a prediction mode commonly used with other coding units. When the prediction mode is commonly used with other coding units, it is determined whether the common prediction mode is determined and transmitted to other coding units, or the common prediction mode determined by other coding units is received and used. One of nine prediction modes is determined as the prediction mode for the intra-picture prediction coding in the case of a block size of 4 pixels×4 pixels as shown in FIG. 12.

Furthermore, the bit stream multiplexing unit 105 multiplexes the coding information into a data stream. This coding information includes the number of prediction modes and an identifier corresponding to the prediction mode, and further includes assignment information indicating a component picture that commonly allocates a prediction mode when a prediction mode commonly used exists in the component picture.

FIG. 13A illustrates a format of a data stream in which coding information and three bit streams are multiplexed when each of the three coding units independently determines a prediction mode as described in above (1). The stream data in the diagram includes the number of prediction modes (number identifier) 610, and prediction mode identifiers (prediction mode) 620R, 620G, and 620B. In this case, the number of prediction modes 610 is 3, indicating that each of the three coding units independently uses a prediction mode. The number of prediction modes 610 may be inserted in a data stream on a macro block, slice, or picture unit basis, and may be applied to macro blocks following the inserted macro block as in the diagram. The prediction mode identifiers 620R, 620G, and 620B are respectively provided for three components of the macro block for every coding data.

FIG. 13B illustrates a format of a data stream in which coding information and three bit streams are multiplexed when the three coding units uses a common prediction mode as described in above (3). The stream data includes the number of prediction modes 610 and a prediction mode identifier 620C. In this case, the number of prediction modes is 1, indicating that one common prediction mode is used among the three coding units. The prediction mode identifier 620C indicates a common prediction mode, and is provided in a head of three component coding data.

FIG. 13C illustrates a format of a data stream in which coding information and three bit streams are multiplexed when the two coding units uses a common prediction mode and one coding unit uses an independent prediction mode, as described in above (2). The stream data in the diagram includes the number of prediction modes 610, assignment information 650, and prediction mode identifiers 620a and 620b. In this case, the number of prediction modes 610 is 2, indicating that one common prediction mode is used between two coding units and the other coding unit independently uses one prediction mode. The prediction mode identifiers 620a and 620b indicate respective prediction modes. The assignment information 650 indicates correspondence between the prediction modes indicated by the prediction mode identifiers 620a and 620b and component coding data. For example, the assignment information 650 indicates that the prediction mode indicated by the prediction mode identifier 620a is common to component coding data 630R and 630G, and the prediction mode indicated by the prediction mode identifier 620*b* is used by component coding data 630B.

FIG. 13D illustrates a data stream in which the intra-picture prediction coding in three coding units has been changed from the above (3) to (1) on the way. As such, the intra coding may be changed dynamically.

As described above, according to the moving picture coding apparatus of the present embodiment, it is possible to select whether the three coding units can use a prediction mode commonly or individually use prediction modes, for the intra-picture prediction coding. One of the above (1) to (3) may be determined in advance, or may be adaptively selected according to details of a moving picture (a motion amount and complexity of a picture).

Note that although the second embodiment describes the moving picture coding apparatus that can adaptively set whether a prediction mode for the intra-picture prediction coding is independently determined in each of the three coding units or commonly used in the three coding units, whether a motion vector for the inter-picture prediction coding is independently determined in each of the three coding units or commonly used in the three coding units may be adaptively set.

Furthermore, although the second embodiment describes a case where coding information includes the number of prediction modes and one or more of identifiers of the prediction modes, when the bit stream multiplexing unit 105 multiplexes the coding information into a data stream, it may include a predetermined prediction mode flag instead of the number of prediction modes. Here, the prediction mode flag is a flag indicating which one of (1) to (3) is used. Although (1) to (3) are described in view of the coding apparatus, in view of stream data, (1) indicates that each of the three component pictures is coded in an independent coding mode. Furthermore, (2) indicates that two component pictures are coded in a common prediction mode, and one component picture is coded in an independent prediction mode. (3) indicates that three color component pictures are coded in a common prediction mode. There are plural methods for representing prediction mode flags.

In the first method for representing a prediction mode flag, the prediction mode flag indicates one of (1) and (3). FIG. 13E illustrates an example of a representation of a flag (Flag_a) in the first method. As in the diagram, the value of Flag_a is 0 in the case of (1) and 1 in the case of (3). In this case, the structure of a coding stream becomes similar to FIGS. 13A, 13B, and 13D. The first method is appropriate as a coding method and a decoding method using above (1) or (3) without using (2). In such a case, the prediction mode flag may be 1 bit.

In the second method for representing a prediction mode flag, the prediction mode flag indicates one of (1) to (3). FIG. 13F illustrates an example of a representation of a flag (Flag_b) in the second method. As in the diagram, the value of Flag_b is 0 in the case of (1), 1 in the case of (2), and 2 in the case of (3). In this case, the structure of a coding stream becomes similar to FIGS. 13A, 13B, 13C and 13D. The second method is appropriate as a coding method and a decoding method, selectively using one of (1) to (3). In such a case, the prediction mode flag may be 2 bits.

In the third method for representing a prediction mode flag, the prediction mode flag indicates two steps (two flags). FIG. 13G illustrates an example of a representation of a flag (Flag_c1,Flag_c2) in the third method. For example, as shown in FIG. 13G, the first prediction mode flag Flag_c1 indicates (2) or other methods (in other words, (1) or (3)), when the first prediction mode flag is other than (2). Further, the second prediction mode flag Flag_c2 indicates either (1) or (3). When the first prediction mode flag Flag_c1 indicates (2), the second prediction mode flag Flag_c2 can be omitted. The third method is appropriate as a coding method and a decoding method, selectively using one of (1) to (3). In such a case, the prediction mode flag may be 1 bit or 2 bits.

Third Embodiment

In the present embodiment, a moving picture decoding apparatus corresponding to the moving picture coding apparatus in FIG. 1 described in the first embodiment is to be described.

FIG. 14 is a block diagram illustrating an example of a structure of the moving picture decoding apparatus of the present invention. The moving picture decoding apparatus 1000 includes a variable length decoding unit 1001, three decoding Units 1002, 1003 and 1004, a signal multiplexing unit 1005, and a probability table holding unit 1010.

A bit stream ST is inputted to the variable length decoding unit 1001. It is assumed that the bit stream ST is obtained by coding a moving picture signal of RGB 4:4:4 format and is the bit stream generated by the moving picture coding apparatus described in the first embodiment.

The bit stream ST inputted to the variable length decoding unit 1001 is variable-length decoded. The examples of the bit stream herein are shown in FIG. 5A and FIG. 5B. As shown in FIG. 5A, when multiplexing bit streams into one bit stream in a unit of block or macro block, there is an effect that the bit stream has a structure that is almost the same as that of the bit stream obtained by coding the conventional YUV pictures. Further, as shown in FIG. 5B, when multiplexing bit streams into a bit stream in a unit of picture or slice, the unit of inverse multiplexing becomes greater so that there is an effect that the inverse multiplexing can be simplified. Further, as the bit stream structure shown in FIG. 5C, in the case where information indicating that each of the R, G, and B signals is independently coded is described in the bit stream, the decoding apparatus can judge easily about whether or not the decoding apparatus can decode the RGB signals independently by checking the information when the decoding apparatus decodes the bit stream.

As an example of the variable length decoding method used by the variable length decoding unit 1001, there is a context adaptive arithmetic decoding method. The context adaptive arithmetic decoding method is a method for switching probability tables used for arithmetic decoding, according to data to be variable length decoded and data that has been variable length decoded (context adaptation). For example, as a context for variable-length decoding the quantized frequency transform coefficients QT, block size for intra prediction, block size for frequency transformation and the like are used. Here, it is assumed that the probability tables are held in the probability table holding unit 1010. Also, the probability tables are different for each of R signal, G signal and B signal.

Among the quantized frequency transform coefficients obtained by performing variable length decoding on the bit stream ST and the data for intra prediction mode and the like, the data of signal DT_R, the data of signal DT_G and the data of signal DT_B are respectively inputted to the decoding units 1002, 1003 and 1004.

Figure 15:
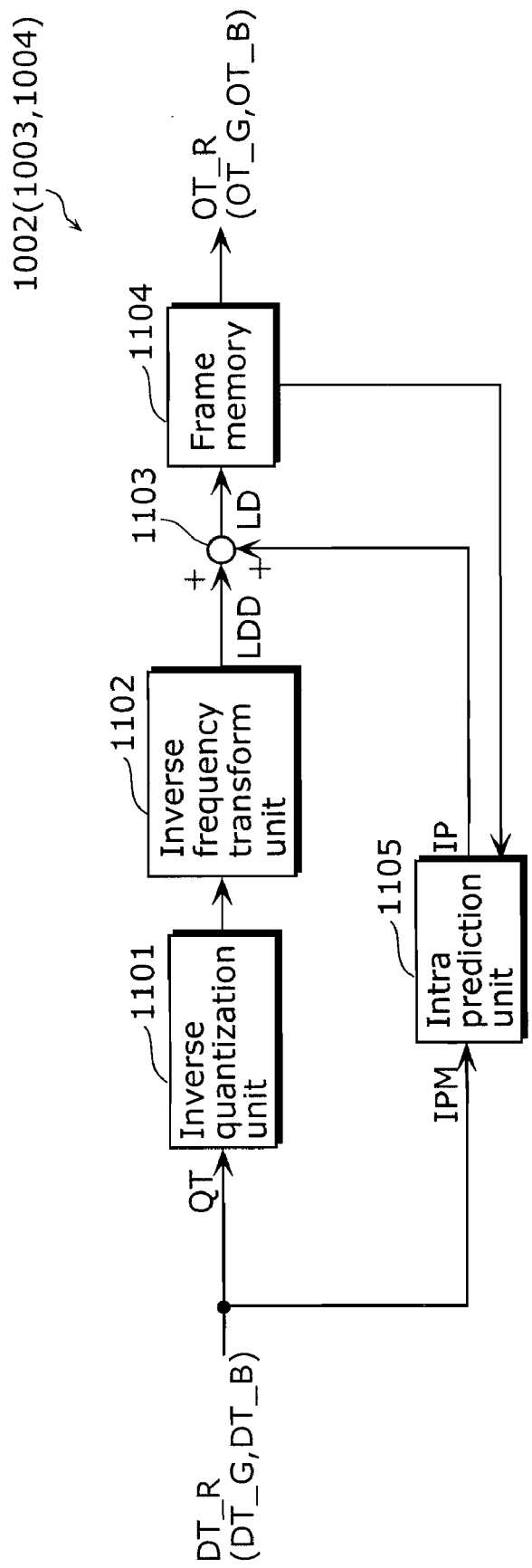
FIG. 15 is a block diagram showing a structure of a decoding unit.

FIG. 15 shows a structure of each of the decoding units 1002, 1003, and 1004. Hereafter, the operation of the decoding unit 1002 which decodes the data of R signal DT_R is described. The structure and the operation are the same for the decoding unit 1003 which decodes the data of G signal DT_G and for the decoding unit 1004 which decodes the data of B signal DT_B.

As shown in FIG. 15, the decoding unit 1002 includes an inverse quantization unit 1101, an inverse frequency transform unit 1102, an adding unit 1103, a frame memory 1104, and an inter prediction unit 1105.

The decoding unit 1102 decodes each picture of the data of R signal DT_R as an intra-picture prediction coded picture.

Among the data DT_R, the information indicating the intra prediction mode is inputted to the intra prediction unit 1105 and the quantized frequency transform coefficients QT are inputted to the inverse quantization unit 1101.

The intra prediction unit 1105 obtains intra reference pixels from the frame memory 1104 and generates an intra predictive image based on the inputted intra prediction mode, and outputs the intra predictive image to the adding unit 1103.

The quantized frequency transform coefficients QT are inverse quantized by the inverse quantization unit 1101, are further inverse frequency transformed by the inverse frequency transform unit 1102, and becomes a decoded differential image LDD. The decoded differential image LDD is added to the intra predictive image IP by the adding unit 1103 so as to obtain the decoded image LD, and LD is stored in the frame memory 1104. The decoded image stored in the frame memory 1104 is used as a reference picture in a later decoding. Also, it is outputted as an output picture OT_R at an appropriate timing.

The output picture of R signal outputted from the decoding unit 1002 OT_R, the output picture of G signal outputted from the decoding unit 1003 OT_G, and the output picture of B signal outputted from the decoding unit 1004 are inputted to the signal multiplexing unit 1005, and are outputted as an RGB color picture signal OUT.

As described in the above, the moving picture decoding apparatus according to the present invention receives the bit stream obtained by coding the moving picture of RGB 4:4:4 format as an input bit stream, separates the input bit stream into data of R signal, data of G signal and data of B signal after performing variable length decoding of the input bit stream, and performs intra predictive decoding respectively on the data of each signal using respective decoding units. Herein, in the intra prediction for decoding each signal, the intra prediction is performed using information of the intra prediction mode determined respectively for each signal. Further, in the variable length decoding using arithmetic decoding, the probability tables are held for respective signals.

Through such operation, the decoding processing after variable length decoding can be performed completely independently for each signal (because it is unnecessary to mutually transfer data and information among decoding units) and the structure of the decoding apparatus can be simplified without reducing the coding efficiency. In this case, each of the RGB signals has an equal number of pixels so that the decoding unit of each signal can have the same hardware structure.

It should be noted that, while the present embodiment describes the case where the picture of RGB 4:4:4 format, that is, a bit stream into which a picture having three color elements is coded is handled, the decoding process can be realized in the same structure even in the case where the number of elements is other than the values indicating three colors (e.g. four colors, six colors and the like). With this, the same effect obtained in the present embodiment can be obtained.

(First Variation)

The third embodiment can be modified as follows. In the present variation, a moving picture decoding apparatus corresponding to the moving picture coding apparatuses in FIGS. 6, 7, and 10 described in the first embodiment is to be described.

Figure 16:
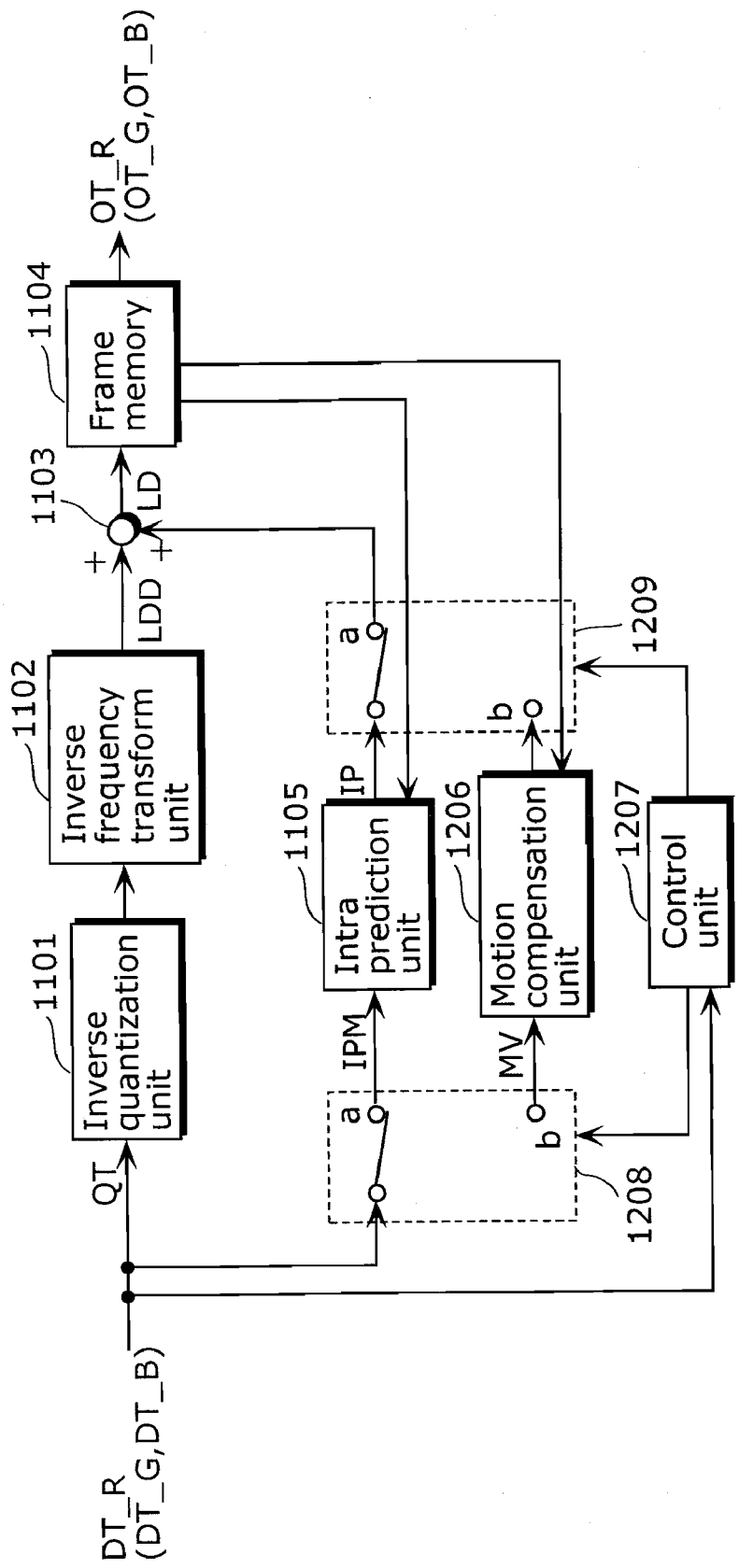
FIG. 16 is a block diagram showing another structure of a decoding unit.

FIG. 16 illustrates an example of a structure that is different from the decoding unit 1002 (decoding unit 1003 or 1004) (for the purpose of distinction, they are called decoding units 1002a, 1003a, and 1004a). The decoding unit 1002a includes, in addition to the structure of the decoding unit 1002 shown in FIG. 15, a motion compensation unit 1206, a control unit 1207, and switches 1208 and 1209.

When coding information is multiplexed in the bit stream ST generated by the moving picture coding apparatuses illustrated in FIGS. 6, 7, and 10, the variable length decoding unit 1001 extracts the coding information from the bit stream ST. This coding information includes the number of prediction modes and one or more of identifiers of the prediction modes as described in FIGS. 13A to 13D, and further includes assignment information indicating component pictures to which a common prediction mode is assigned when the prediction mode common to the color component pictures exists in the coding information. According to the prediction mode or the prediction modes indicated by this coding information, the three decoding units 1002a, 1003a, and 1004a decode respective R, G, and B component pictures.

Whereas the decoding unit 1002 decodes each picture of the data of R signal DT_R into an intra-picture predictive coded picture, the decoding unit 1002a differs from the decoding unit 1002 in that it can decode the picture of the data of R signal DT_R into an intra-picture prediction coded picture.

The method for the coding unit 102a to decode a picture into an intra-picture prediction coded picture is the same as the method described in the second embodiment. Therefore, the explanation about the same method is omitted here (the processing is performed by connecting the switches 1208 and 1209 to "a").

An operation in the case where the picture of the data DT_R is decoded into an inter-picture prediction coded picture is to be described. Note that, herein in the case where the context adaptive arithmetic decoding method is used in the variable length decoding unit 1001, different probability tables are used for R signal, G signal and B signal.

Among the data DT_R, the coding mode MD is inputted to the control unit 1207, the information indicating the intra prediction mode IPM or the motion vector MV is inputted to the switch 1208, and the quantized frequency transform coefficients QT are inputted to the inverse quantization unit 1101.

The control unit 1207 controls the switch 1208 based on the coding mode MD. In the case where the coding mode MD indicates the intra prediction coding, the switch 1208 is connected to "a", and the information indicating the intra prediction mode IPM is inputted to the intra prediction unit 1105. In the case where the coding mode MD indicates the inter-picture prediction coding, the switch 1208 is connected to "b", and the motion vector MV is inputted to the motion compensation unit 1206. The processing in the case where the coding mode MD indicates the intra prediction coding is the same as the processing explained in the second embodiment. Therefore, the explanation about the same processing is omitted here. Hereafter, the case where the coding mode MD indicates the inter-picture prediction coding is to be described.

The motion compensation unit 1206, based on the inputted motion vector MV, obtains reference pixels from the frame memory 1104, generates a predictive picture, and outputs the predictive picture to the adding unit 1103.

The processing of the inverse quantization unit 1101, inverse frequency transform unit 1102 and adding unit 1103 are the same as the processing explained in the second embodiment, and the decoded images LDs are generated through the processing. The decoded images LDs are stored in the frame memory 1104. The decoded images stored in the frame memory 1104 are used as reference pictures for the later decoding. Also, the decoded images are outputted as output pictures OT_R at an appropriate timing.

The output picture of R signal outputted from the decoding unit 1002 OT_R, the output picture of G signal outputted from the decoding unit 1003, and the output picture of B signal outputted from the decoding unit 1004 OT_B are inputted to the signal multiplexing unit 1005, multiplexed and outputted as an RGB color picture signal OUT.

As described in the above, the moving picture decoding apparatus according to the present invention receives a bit stream obtained by coding the moving picture of RGB 4:4:4 format as an input bit stream, separates the input bit stream into data of R signal, data of G signal and data of B signal after performing variable length decoding of the input bit stream, and decodes data of each signal independently using a decoding unit that is different for each signal. Herein, in the intra prediction for decoding each signal, the intra prediction is executed using information of the intra prediction mode determined independently for each signal. Also, in the inter-picture prediction for decoding each signal, the inter-picture prediction (motion compensation) is executed using information of the motion vector determined independently for each signal. Further, in the variable length decoding using arithmetic decoding, each signal respectively holds a probability table.

Through such operation, decoding processing after the variable length decoding can be performed independently for each signal (because it is unnecessary to mutually transfer data and information among decoding units). Therefore, as a moving picture having a degree of resolution that is equal to or greater than the HDTV, in the case where single decoding apparatus cannot decode a picture because there are too many number of pixels to be processed, each signal can be decoded in parallel. In this case, the RGB signals have the same number of pixels so that a decoding unit of each signal can have the same hardware structure. Therefore, even in the case where there are too many number of pixels to be processed, the structure of the decoding apparatus as a whole and the processing details can be simplified.

Note that it is described that the aforementioned coding information includes the number of prediction modes and one or more identifiers of the prediction modes, a predetermined prediction mode flag may be included instead of the number of prediction modes. Here, the prediction mode flag indicates a flag using one of (1) to (3). There are plural methods for representing prediction mode flags.

The first method for representing a prediction mode flag indicates one of (1) and (3). For example, the flag shown in FIG. 13E indicates that the value of the flag is 0 in the case of (1), and 1 in the case of (3). In this case, the structure of a coding stream becomes similar to FIGS. 13A, 13B, and 13D.

The second method for representing a prediction mode flag indicates one of (1) to (3). For example, the flag shown in FIG. 13F indicates that the value of the flag is 0 in the case of (1), 1 in the case of (2), and 2 in the case of (3). In this case, the structure of a coding stream becomes similar to FIGS. 13A, 13B, 13C and 13D.

The third method for representing a prediction mode flag indicates two steps (two flags). For example, as shown in FIG. 13G, the first prediction mode flag indicates (2) or other methods (in other words, (1) or (3)), and when the first prediction mode flag is other than (2), further, the second prediction mode flag indicates either (1) or (3).

With such a prediction mode flag, the picture decoding apparatus can easily judge whether coding processing has been performed using the prediction mode in one of the above (1) to (3). Furthermore, according to the coding information, the prediction modes used in each of the three decoding units can be identified easily.

Furthermore, in the aforementioned case, a prediction mode flag is described when the number of component pictures for each color is 3. Next, a case where the number of component pictures is generalized into N is to be described.

In the first method, the prediction mode flag Flag_a indicates one of: (1) that each of the N color component pictures has been coded in an independent prediction mode; and (3) that the N color component pictures have been coded in a common prediction mode.

In the second method, the prediction mode flag Flag_b indicates one of: (1) that each of the N color component pictures has been coded in an independent prediction mode; (3) that the N color component pictures have been coded in a common prediction mode; and (2) that two or more of the N color component pictures have been coded in a common prediction mode and one or more of the N color component pictures other than the two or more of the N color component pictures has been coded in an independent prediction mode.

In the third method, the prediction mode flag includes the first flag flag_c1. The first flag flag_c1 indicates one of: (2) that two or more of the N color component pictures have been coded in a common prediction mode and one or more of the N color component pictures other than the two or more of the 1N color component pictures has been coded in an independent prediction mode; and a case other than (2). When the first flag flag_c1 indicates a case other than (2), the prediction mode flag further includes the second flag. The second flag indicates one of: (1) that each of the N color component pictures has been coded in an independent prediction mode; and (3) that the N color component pictures have been coded in a common prediction mode.

(Second Variation)

The second variation of the third embodiment is described.

A bit stream ST is inputted to the variable length decoding unit 1001. The bit stream ST is obtained by coding the moving picture signal of RGB 4:4:4 format, and generated by the moving picture coding apparatus described in the second variation of the first embodiment.

The bit stream ST inputted to the variable length decoding unit 1001 is variable-length decoded. FIG. 5 (*e*) shows an example of a bit stream structure for this case. The second variation differs from the first variation of the third embodiment in that the motion vector information is described commonly for the R signal, the G signal and the B signal in the macro block that is inter-picture prediction coded. The variable length decoding unit 1001 copies the motion vector information obtained by performing variable length decoding on the bit stream ST to the data of R signal DT_R, the data of G signal DT_G and the data of B signal DT_B, and outputs the result to the decoding units 1002*a*, 1003*a* and 1004*a*. Note that herein in the case where the variable length decoding unit 1001 uses the context adaptive arithmetic decoding method, the probability table for the motion vector is used commonly for the R signal, the G signal and the B signal (common among blocks and macro blocks).

The later processing is the same as the processing described in the first variation of the third embodiment. Therefore, the explanation about the same processing is omitted in here.

As described in the above, the moving picture decoding apparatus according to the present invention receives the bit stream obtained by coding the moving picture of the RGB 4:4:4 format as an input bit stream, separates the input bit stream into the data of R signal, the data of G signal and the data of B signal after variable length decoding, and decodes data of each signal independently using a different decoding unit. Herein, in the intra-picture prediction for decoding each signal, the intra prediction is performed using information of the intra prediction mode determined independently for each signal. Further, in the inter-picture prediction for decoding each signal, the inter-picture prediction (motion compensation) is performed using information of the motion vector that is common to all of the signals. Furthermore, in the variable length decoding using the arithmetic decoding, the data other than the motion vector is held in a probability table for each of the signals.

Through such operation, in the intra-picture prediction coded macro block within the intra-picture prediction coded picture or within the inter-picture prediction coded picture, decoding is performed completely independently for each signal, while in the inter-picture prediction coded macro block, the motion vector common to all signals is used. In general, in the intra-picture prediction coded macro block, while the amount of codes for the quantization frequency transform coefficients occupies a considerable amount of codes to be generated, the amount of information of the intra prediction mode is small. Further, in the inter-picture prediction coded macro block, the amount of codes for the motion vector has the high percentage of the total amount of codes to be generated. Therefore, in the processing of the present intra-picture coded picture, the structure (processing) of the decoding apparatus can be simplified without reducing the coding efficiency, and in the processing of inter-picture prediction coded picture, although the structure (processing) of the decoding apparatus becomes slightly complicated, the coding efficiency can be increased (because the number of motion vectors described in the bit stream becomes less). Therefore, as a moving picture having a degree of resolution that is equal to or greater than the HDTV, in the case where a single decoding apparatus cannot decode a picture because there are too many number of pixels to be processed, each signal can be decoded in parallel. In this case, the RGB signals have the same number of pixels so that a decoding unit of each signal can have the same hardware structure.

Note that the present invention is not limited to the aforementioned embodiments, and it is possible to modify or change the present invention without departing from the scope of the invention.

Finally, an application example of the moving picture coding apparatus described in the first and second embodiments is to be described.

Figure 17:
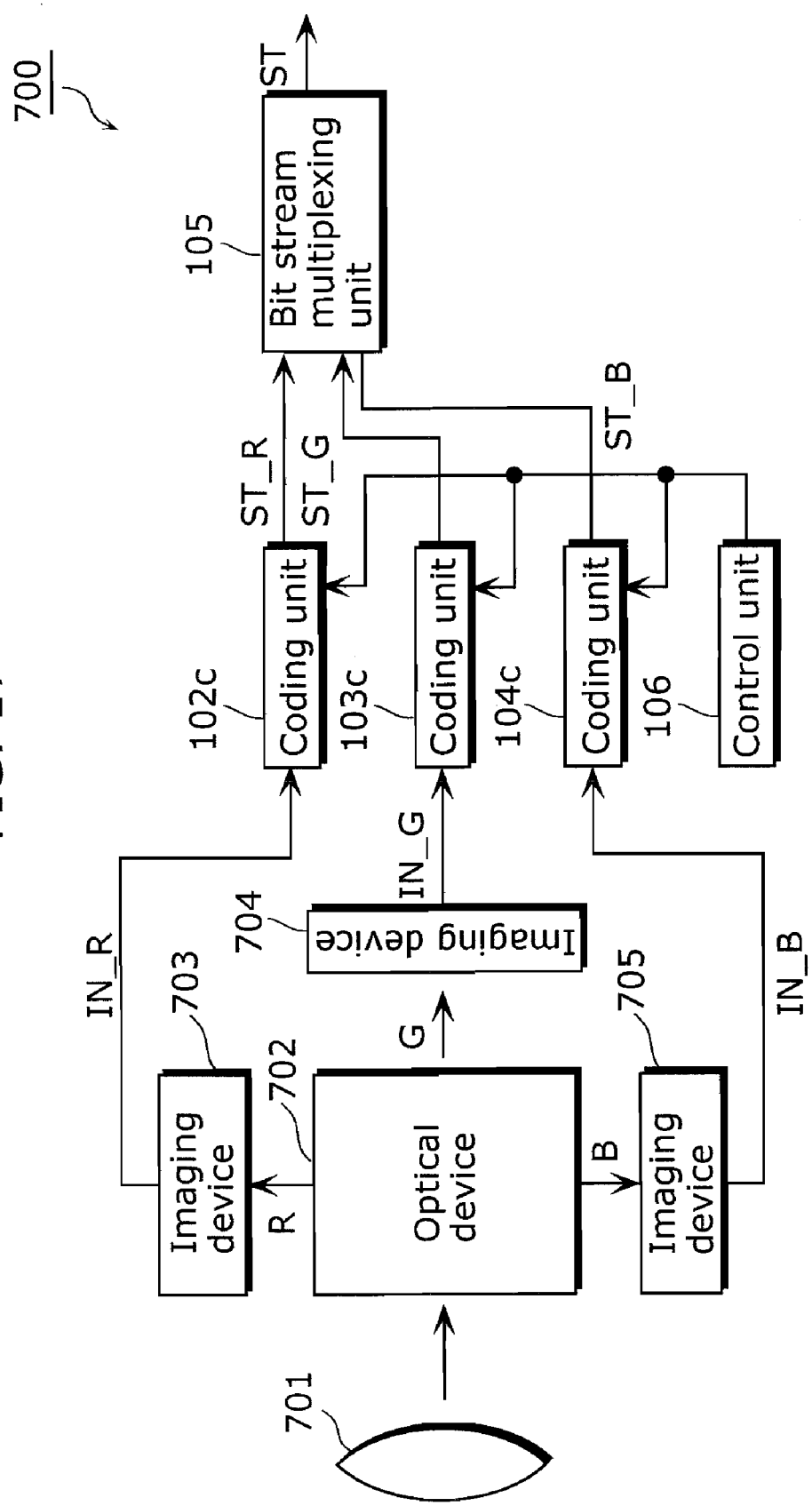
FIG. 17 is a block diagram illustrating a structure of a video camera as an application example of the present invention.

FIG. 17 is a block diagram illustrating main units of a video camera that applies the present invention. A video camera 700 is referred to as a three imaging camera, and it differs from the apparatus illustrated in FIG. 10 in that it includes a lens 101, an optical device 702, and imaging devices 703 to 705, instead of the signal separation unit 101. The optical device 702 separates incident light that passes through the lens 101 into primary colors, blue, green and red. The imaging devices 703 to 705 capture respective R, G, and B component pictures having the same number of pixels which correspond to the obtained colors, blue, green and red. The captured three component pictures are inputted to the coding units 102c, 103c, and 104c.

Note that in FIG. 17, the apparatus may include the coding units 102b, 103b, and 104b; the coding units 102a, 103a, and 104a; or the coding units 102, 103, and 104, instead of the coding units 102c, 103c, and 104c.

INDUSTRIAL APPLICABILITY

The present invention is for a moving picture coding apparatus, a moving picture decoding apparatus, and a bit stream format, and in particular, is applicable to a moving picture recording/reproducing apparatus, a video camera, a television camera for professional-use, and the like.

The invention claimed is:

1. A moving picture coding apparatus comprising:
    an obtainment unit operable to obtain N color component pictures that compose one picture, where N is an integer that is 2 or greater;
    N coding units, each of which is operable to code, in one of intra-picture prediction coding and inter-picture prediction coding, a corresponding one of the N color component pictures, said N coding units being provided so as to correspond to the N color component pictures; and
    a signal multiplexing unit operable to multiplex N bit streams outputted from said N coding units into one bit stream signal, and to output the bit stream signal,
    wherein said N coding units are operable to individually use respective prediction modes or commonly use a prediction mode for the intra-picture prediction coding or the inter-picture prediction coding,
    said signal multiplexing unit is operable to insert, in the bit stream signal, coding information indicating correspondence between the N color component pictures and prediction modes to be used for one of the intra-picture prediction coding and the inter-picture prediction coding,
    the coding information includes a first prediction mode flag,
    the first prediction mode flag indicates one of: (i) that two or more of the N color component pictures have been coded in a common prediction mode and one or more of the N color component pictures other than the two or more of the N color component pictures has been coded in an independent prediction mode; and (ii) a case other than (i),
    the coding information further includes a second prediction mode flag when the first prediction mode flag indicates (ii), and
    the second prediction mode flag indicates one of: (a) that each of the N color component pictures has been coded in an independent prediction mode; and (b) that the N color component pictures have been coded in a common prediction mode.

2. The moving picture coding apparatus according to claim 1,
    wherein said N coding units are N semiconductor integrated devices.

3. A moving picture decoding apparatus comprising:
    a separation unit operable to separate a bit stream signal into N bit streams corresponding to N color component pictures that compose one picture, where N is an integer that is 2 or greater, the bit stream signal indicating a coded moving picture;
    N decoding units, each of which is operable to decode, in one of intra-picture prediction decoding and inter-picture prediction decoding, a corresponding one of the N bit streams, said N decoding units being provided so as to correspond to the N bit streams; and a picture multiplexing unit operable to multiplex the N color component pictures from said N decoding units into the one picture, wherein said separation unit is operable to separate the bit stream signal into coding information indicating correspondence between the N color component pictures and prediction modes to be used for one of the intra-picture prediction decoding and the inter-picture prediction decoding, each of said N decoding units is operable to perform the intra-picture prediction decoding according to the coding information, the coding information includes a first prediction mode flag, the first prediction mode flag indicates one of: (i) that two or more of the N color component pictures have been coded in a common prediction mode and one or more of the N color component pictures other than the two or more of the N color component pictures has been coded in an independent prediction mode; and (ii) a case other than (i), the coding information further includes a second prediction mode flag when the first prediction mode flag indicates (ii), and the second prediction mode flag indicates one of: (a) that each of the N color component pictures has been coded in an independent prediction mode; and b that the N color component pictures have been coded in a common prediction mode.

4. The moving picture decoding apparatus according to claim 3, wherein said N decoding units are N semiconductor integrated devices.

5. A moving picture coding method comprising:

obtaining N color component pictures that compose one picture, where N is an integer that is 2 or greater;

coding, in one of intra-picture prediction coding and inter-picture prediction coding, a corresponding one of the N color component pictures in N coding units that correspond to the N color component pictures; and multiplexing N bit streams outputted from the N coding units into one bit stream signal, and outputting the bit stream signal, wherein the N coding units are operable to individually use respective prediction modes or commonly use a prediction mode for the intra-picture prediction coding or the inter-picture prediction coding, said multiplexing comprises inserting, in the bit stream signal, coding information indicating correspondence between the N color component pictures and prediction modes to be used for one of the intra-picture prediction coding and the inter-picture prediction coding, the coding information includes a first prediction mode flag, the first prediction mode flag indicates one of: (i) that two or more of the N color component pictures have been coded in a common prediction mode and one or more of the N color component pictures other than the two or more of the N color component pictures has been coded in an independent prediction mode; and (ii) a case other than (i), the coding information further includes a second prediction mode flag when the first prediction mode flag indicates (ii), and the second prediction mode flag indicates one of: (a) that each of the N color component pictures has been coded in an independent prediction mode; and b that the N color component pictures have been coded in a common prediction mode.

6. A moving picture decoding method comprising:

separating a bit stream signal into N bit streams corresponding to N color component pictures that compose one picture, where N is an integer that is 2 or greater, the bit stream signal indicating a coded moving picture;

decoding, in one of intra-picture prediction decoding and inter-picture prediction decoding, a corresponding one of the N bit streams in N decoding units that correspond to the N bit streams; and multiplexing the N color component pictures from the N decoding units into the one picture, wherein said separating comprises separating the bit stream signal into coding information indicating correspondence between the N color component pictures and prediction modes to be used for one of the intra-picture prediction decoding and the inter-picture prediction decoding, each of the N decoding units is operable to perform the intra-picture prediction decoding according to the coding information, the coding information includes a first prediction mode flag, the first prediction mode flag indicates one of: (i) that two or more of the N color component pictures have been coded in a common prediction mode and one or more of the N color component pictures other than the two or more of the N color component pictures has been coded in an independent prediction mode; and (ii) a case other than (i), the coding information further includes a second prediction mode flag when the first prediction mode flag indicates (ii), and the second prediction mode flag indicates one of: (a) that each of the N color component pictures has been coded in an independent prediction mode; and b that the N color component pictures have been coded in a common prediction mode.

7. A stream data that is computer readable, comprising N bit streams and a prediction mode flag, wherein said N bit streams represent N color component pictures that compose one picture, where N is an integer that is 2 or greater, said prediction mode flag includes a first prediction mode flag indicating correspondence between the N color component pictures and prediction modes to be used for intra-picture prediction coding, the first prediction mode flag indicates one of: (i) that two or more of the N color component pictures have been coded in a common prediction mode and one or more of the N color component pictures other than the two or more of the N color component pictures has been coded in an independent prediction mode; and (ii) a case other than (i), said prediction mode flag further includes a second prediction mode flag when the first prediction mode flag indicates (ii), and the second prediction mode flag indicates one of: (a) that each of the N color component pictures has been coded in an independent prediction mode; and b that the N color component pictures have been coded in a common prediction mode.

* * * * *

UNITED STATES PATENT AND TRADEMARK OFFICE
CERTIFICATE OF CORRECTION

| | | |
|---|---|---|
| PATENT NO. | : 8,204,113 B2 | Page 1 of 1 |
| APPLICATION NO. | : 11/996034 | |
| DATED | : June 19, 2012 | |
| INVENTOR(S) | : Satoshi Kondo | |

It is certified that error appears in the above-identified patent and that said Letters Patent is hereby corrected as shown below:

On the Title Page

In item (22), "Jun. 18, 2006" should read --Jul. 18, 2006--.

Signed and Sealed this
Eighteenth Day of December, 2012

David J. Kappos
*Director of the United States Patent and Trademark Office*